(12) United States Patent
Toyama et al.

(10) Patent No.: US 8,013,952 B2
(45) Date of Patent: *Sep. 6, 2011

(54) LED BACKLIGHT DEVICE AND LCD DEVICE

(75) Inventors: Hiroshi Toyama, Tokyo (JP); Yukio Nakamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 280 days.

This patent is subject to a terminal disclaimer.

(21) Appl. No.: 12/318,114

(22) Filed: Dec. 22, 2008

(65) Prior Publication Data

US 2009/0161039 A1 Jun. 25, 2009

(30) Foreign Application Priority Data

Dec. 25, 2007 (JP) .................................. 2007-331293
Dec. 25, 2007 (JP) .................................. 2007-331693

(51) Int. Cl.
G02F 1/13357 (2006.01)
H01L 33/00 (2010.01)

(52) U.S. Cl. .......................................... 349/69; 257/79

(58) Field of Classification Search ..................... 349/69, 349/68, 71; 362/97.3; 313/499; 257/79
See application file for complete search history.

(56) References Cited

U.S. PATENT DOCUMENTS

| | | | |
|---|---|---|---|
| 7,006,172 B2* | 2/2006 | Kawana et al. | 349/71 |
| 7,863,614 B2* | 1/2011 | Toyama et al. | 257/59 |
| 7,884,371 B2* | 2/2011 | Toyama et al. | 257/72 |
| 7,884,374 B2* | 2/2011 | Toyama et al. | 257/79 |
| 2007/0080626 A1* | 4/2007 | Son et al. | 313/499 |

FOREIGN PATENT DOCUMENTS

| | | |
|---|---|---|
| JP | 63-278285 | 11/1988 |
| JP | 07-237317 | 9/1995 |
| JP | 8-236695 | 9/1996 |
| JP | 11-266035 | 9/1999 |
| JP | 2000-106454 | 4/2000 |
| JP | 2002-311412 | 10/2002 |
| JP | 2002-329587 | 11/2002 |
| JP | 2004-319458 | 11/2004 |
| JP | 2005-150703 | 6/2005 |
| JP | 2006-215582 | 8/2006 |
| JP | 2006-339151 | 12/2006 |
| JP | 2007-329219 | 12/2007 |

\* cited by examiner

*Primary Examiner* — Akm E Ullah
(74) *Attorney, Agent, or Firm* — Rabin & Berdo, PC

(57) ABSTRACT

A backlight device includes a first substrate having optical transparency and having a first surface and a second surface. An LED thin-film is fixed to the first surface of the first substrate. The LED thin-film is formed of epitaxially grown inorganic material layers as a P-N junction device. An anode electrode and a cathode electrode are formed on the LED thin-film. An anode driver IC and a cathode driver IC are provided for driving the LED thin-film. An anode wiring is provided for connecting the anode driver IC and the anode electrode, and a cathode wiring is provided for connecting the cathode driver IC and the cathode electrode. A second substrate has optical transparency and having a function to diffuse incident light. The second substrate is provided so as to face the second surface of the first substrate.

27 Claims, 29 Drawing Sheets

LED BACKLIGHT DEVICE AND LCD DEVICE

BACKGROUND OF THE INVENTION

The present invention relates to an LED backlight device and an LCD device using the LED backlight device.

A general LED (Light Emitting Diode) backlight device includes individually molded LED elements arranged at suitable intervals. An LCD (Liquid Crystal Display) panel is provided facing the LED backlight device so as to constitute an LCD device, and a light diffusion plate is provided between the LED backlight device and the LCD panel for uniformly illuminating the LCD panel.

To be more specific, the conventional LCD device using the LED backlight device includes a prism sheet provided on the backside of the LCD panel, a first diffusion plate disposed on the backside of the prism sheet, a plurality of LED elements (i.e., individually molded LED elements that emit white lights) mounted on a substrate disposed on the backside of the first diffusion plate, and a second diffusion plate disposed on the backside of the substrate. The second diffusion plate is attached to a window for introducing external light. The LCD panel is uniformly illuminated with white light emitted by the white LED elements and the external light (see, for example, Patent Document 1).

Another conventional LCD device using the LED backlight device includes a light diffusion plate (having convexes and concaves) disposed on the backside of the LCD panel, a plurality of LED elements (i.e., individually molded LED elements that emit lights of primary colors) mounted on a substrate disposed on the backside of the light diffusion plate, and a reflection plate provided covering a surface of the substrate around the LED elements for enhancing intensity of light illuminating the LCD panel. Further, heat sinks or heat pipes are provided between the LED elements and the substrate for dissipating the heat generated by the LEDs (see, for example, Patent Document 2).

Patent Document 1: Japanese Laid-open Patent Publication No. 2002-311412

Patent Document 2: Japanese Laid-open Patent Publication No. 2004-319458

SUMMARY OF THE INVENTION

The present invention is intended to provide a thin and high-intensity LED backlight device, and an LCD device using such an LED backlight.

The present invention provides a backlight device including a first substrate having optical transparency and having a first surface and a second surface opposite to the first surface. An LED thin-film is fixed to the first surface of the first substrate. The LED thin-film is formed of epitaxially grown inorganic material layers as a P-N junction device. An anode electrode and a cathode electrode are formed on the LED thin-film. An anode driver IC and a cathode driver IC are provided for driving the LED thin-film to emit light. An anode wiring is formed on the first surface of the first substrate to electrically connect the anode driver IC and the anode electrode of the LED thin-film. A cathode wiring is formed on the first surface of the first substrate to electrically connect the cathode driver IC and the cathode electrode of the LED thin-film. A second substrate has optical transparency and has a function to diffuse incident light. The second substrate is provided so as to face the second surface of the first substrate.

Since the second substrate has a function to diffuse incident light and is provided so as to face the second surface (opposite to the first surface to which the LED thin-film is fixed) of the first substrate, the thickness of the LED backlight device can be reduced, and the amount of light emission can be increased. Therefore, a thin and high-intensity LED backlight device can be obtained.

The present invention also provide an LED backlight device including a first substrate having a function to diffuse incident light, having optical transparency, and having a first surface. An LED thin-film is fixed to the first surface of the first substrate. The LED thin-film is formed of epitaxially grown inorganic material layers as a P-N junction device. An anode electrode and a cathode electrode are formed on the LED thin-film. An anode driver IC and a cathode driver IC are provided for driving the LED thin-film to emit light. An anode wiring is formed on the first surface of the first substrate to electrically connect the anode driver IC and the anode electrode of the LED thin-film. A cathode wiring is formed on the first surface of the first substrate to electrically connect the cathode driver IC and the cathode electrode of the LED thin-film.

The present invention also provides an LED backlight device including a first substrate having thermal conductivity and having a first surface. An LED thin-film is fixed to the first surface of the first substrate. The LED thin-film is formed of epitaxially grown inorganic material layers as a P-N junction device. An anode electrode and a cathode electrode are formed on the LED thin-film. An anode driver IC and a cathode driver IC are provided for driving the LED thin-film to emit light. An anode wiring is formed on the first surface of the first substrate to electrically connect the anode driver IC and the anode electrode of the LED thin-film. A cathode wiring is formed on the first surface of the first substrate to electrically connect the cathode driver IC and the cathode electrode of the LED thin-film. A second substrate has optical transparency and has a function to diffuse incident light. The second substrate is provided so as to face the first surface of the first substrate.

Since the LED thin-film is provided on the first substrate having thermal conductivity, the heat can be released from a second surface (opposite to the first surface to which the LEDs are fixed) of the first substrate. Therefore, the thickness of the LED backlight device can be reduced, and the heat releasing property can be enhanced.

The present invention also provides an image forming apparatus including the above described LED backlight device and an LCD panel provided so as to face the LED backlight device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Hereinafter, embodiments of the present invention will be described with reference to the attached drawings.

First Embodiment

Figure 1:
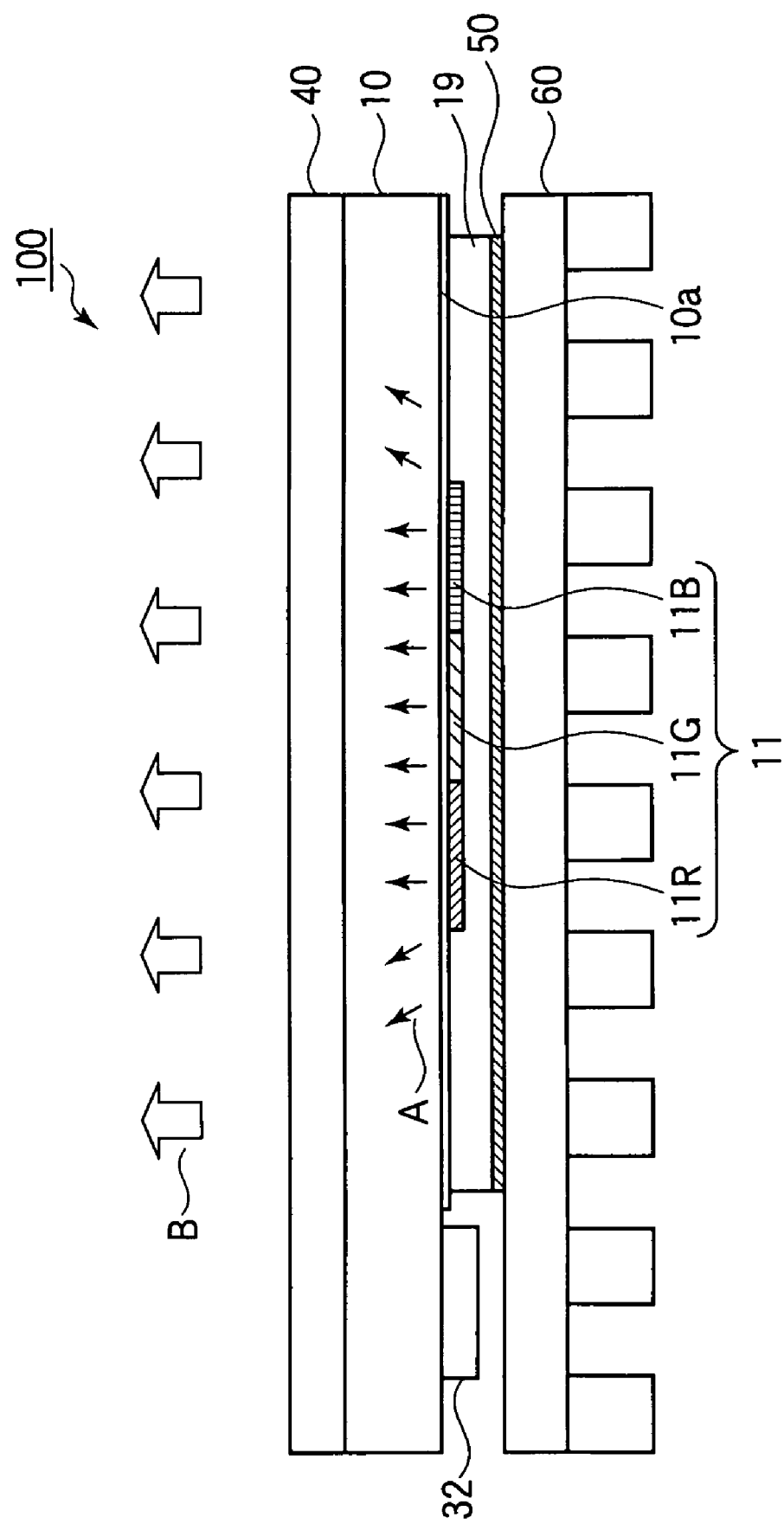
FIG. 1 is a side sectional view showing an LED backlight device according to the first embodiment of the present invention.
Figure 2:
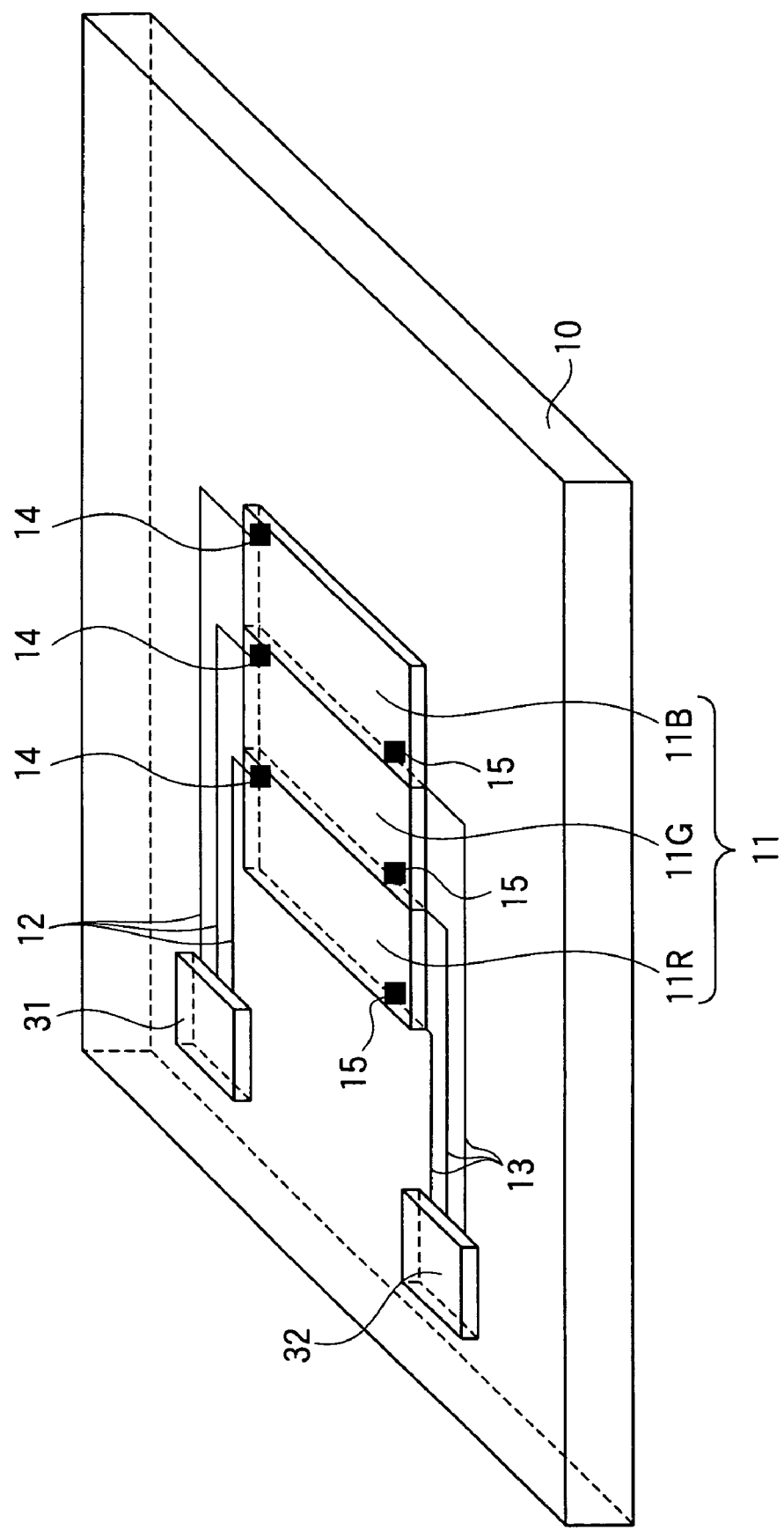
FIG. 2 is a perspective view showing an arrangement of LEDs according to the first embodiment of the present invention.
Figure 3:
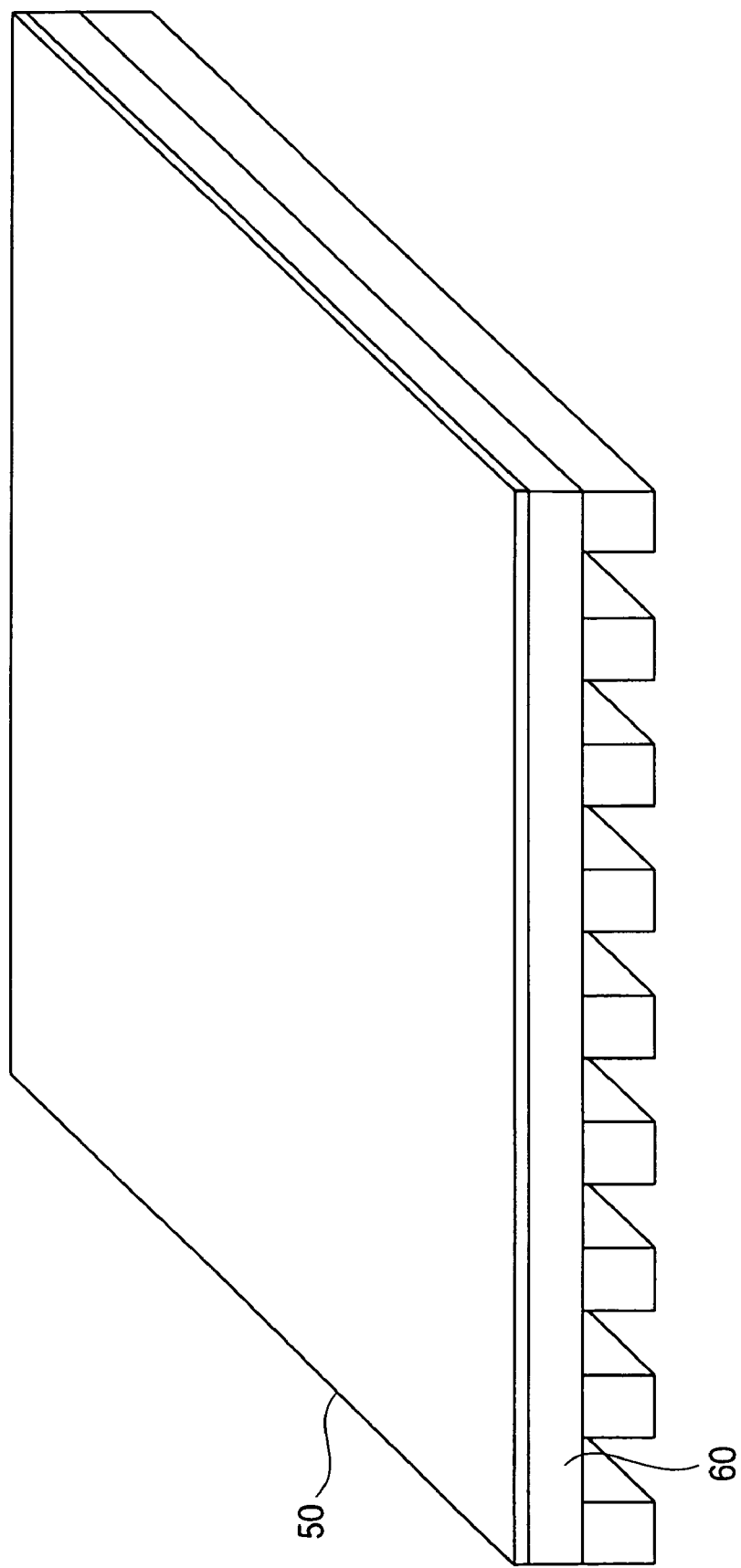
FIG. 3 is a perspective view showing a heat releasing plate according to the first embodiment of the present invention.
Figure 4:
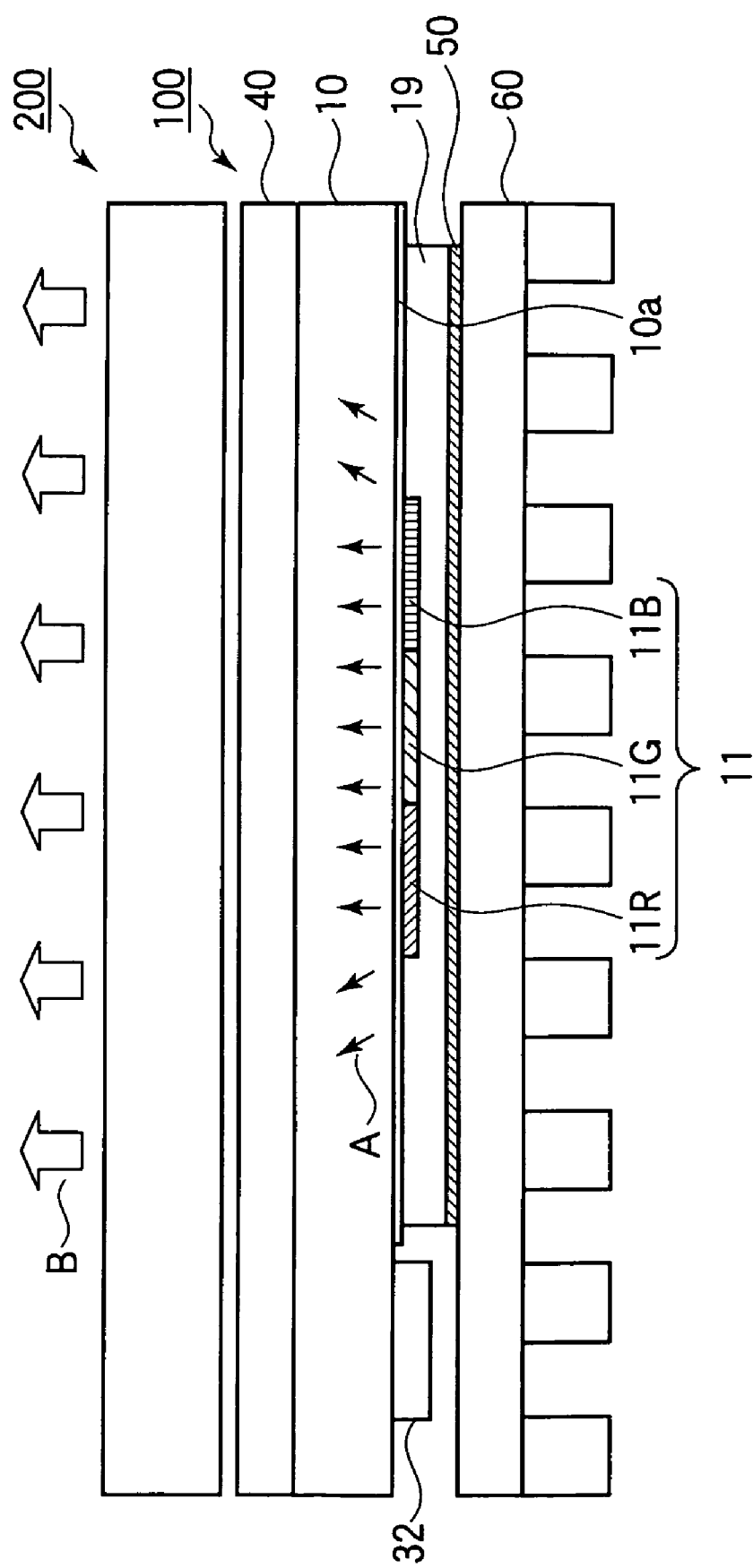
FIG. 4 is a side sectional view showing an LCD device including the LED backlight device according to the first embodiment of the present invention.

FIG. 1 is a side sectional view showing an LED backlight device according to the first embodiment of the present invention. FIG. 2 is a perspective view showing an arrangement of LEDs according to the first embodiment of the present invention. FIG. 3 is a perspective view showing a heat releasing plate according to the first embodiment of the present invention. FIG. 4 is a side sectional view showing an LCD device using the LED backlight device according to the first embodiment of the present invention.

As shown in FIG. 4, an LED backlight device 100 according to the first embodiment and an LCD panel 200 constitute an LCD device. The LED backlight device 100 is disposed on a backside of the LCD panel 200 (i.e., a side of the LCD panel 200 opposite to a display surface), and functions as a light source for illuminating the LCD panel 200. The LCD panel 200 is of a transmission type.

As shown in FIG. 1, the LED backlight device 100 includes a substrate 10 (i.e., a first substrate) in the form of a flat plate. The substrate 10 has a first surface (i.e., a lower surface in FIG. 1) and a second surface (i.e., an upper surface in FIG. 1) opposite to the first surface. The LED backlight device 100 further includes LEDs 11 (i.e., LED thin-film) fixed to the first surface of the substrate 10. The LEDs 11 include an LED 11R that emits red light, an LED 11G that emits green light, and an LED 11B that emits blue light. When the LEDs 11R, 11G and 11B are collectively explained, the LEDs 11R, 11G and 11B are referred to as LEDs 11.

As shown in FIG. 2, an anode driver IC 31 and a cathode driver IC 32 for driving the LED 11 are disposed on the first surface of the substrate 10. Anode wirings 12 are formed on the first surface of the substrate 10, and ends of the anode wirings 12 are connected to the anode driver IC 31. The anode wirings 12 are connected to respective anode electrodes 14 formed on the LEDs 11. Cathode wirings 13 are formed on the first surface of the substrate 10, and ends of the cathode wirings 13 are connected to the cathode driver IC 32. The cathode wirings 13 are connected to respective cathode electrodes 15 formed on the LEDs 11.

As shown in FIG. 1, the LED backlight device 100 further includes a light diffusion plate 40 (i.e., a second substrate) in the form of a flat plate disposed on the second surface (i.e., the upper surface in FIG. 1) of the substrate 10. A protection film 19 is formed on the first surface of the substrate 10 so as to entirely cover the LEDs 11. A heat releasing plate 60 is fixed to a surface (i.e., a lower surface in FIG. 1) of the protection film 19 opposite to the LEDs 11 using a thermally-conductive adhesive agent 50.

The substrate 10 is preferably composed of, for example, a quartz or glass substrate having excellent optical transparency, or a resin substrate composed of acryl or the like having optical transparency. The substrate 10 has a surface layer (denoted by a numeral 10a in FIG. 1) composed of an organic insulation film (such as polyimide film) or an inorganic insulation film. The surface layer 10a is planarized so that the surface accuracy is several tens of nanometers or less. The LED 11R that emits red light, the LED 11G that emits green light, and the LED 11B that emits blue light are composed of layered thin-films. The LEDs 11R, 11G and 11B are peeled off from another substrate as described later, and are fixed to the substrate 10 by means of intermolecular force such as hydrogen bonding so as to be integrated with the substrate 10.

The LED 11R (that emits red light) is composed of a layered thin-film having heterostructure or double heterostructure formed by epitaxially growing inorganic material such as aluminum gallium arsenide, aluminum gallium indium arsenide or the like. The LED 11R is not limited to these materials, but can be composed of any kind of material that emits light having the wavelength in a range from 620 nm to 710 nm. The LED 11G (that emits green light) is composed of a layered thin-film having heterostructure or double heterostructure formed by epitaxially growing inorganic material such as aluminum gallium indium phosphide, gallium phosphide or the like. The LED 11G is not limited to these materials, but can be composed of any kind of material that emits light having the wavelength in a range from 500 nm to 580 nm. The LED 11B (that emits blue light) is composed of a layered thin-film having heterostructure or double heterostructure formed by epitaxially growing inorganic material such as gallium nitride, gallium indium nitride or the like. The LED 11B is not limited to these materials, but can be composed of any kind of material that emits light having the wavelength in a range from 450 nm to 500 nm.

The anode electrodes 14 and the cathode electrodes 15 are metal electrodes composed of gold, aluminum, or layered metal electrodes composed of gold or aluminum layered with nickel, titan or the like. The anode electrodes 14 and the cathode electrodes 15 are respectively connected to anodes and cathodes of the LEDs 11.

The anode wirings 12 and the cathode wirings 13 are metal wirings composed of gold, aluminum, or layered metal wirings composed of gold or aluminum layered with nickel, titan or the like. The anode wirings 12 and the cathode wirings 13 are respectively connected to the anode electrodes 14 and the cathode electrodes 15 of the LEDs 11. The ends of the anode wirings 12 are connected to the anode driver IC 31, and the ends of the cathode wirings 13 are connected to the cathode driver IC 32, so that the anode electrodes 14 and the cathode electrodes 15 of the LEDs 11 are connected to the anode driver IC 31 and the cathode driver IC 32 via the anode wirings 12 and the cathode wirings 13.

The light diffusion plate 40 is formed of a plastic substrate having optical transparency. To be more specific, the light diffusion plate 40 is composed of polymer material such as polycarbonate or polyethylene terephthalate. The light diffusion plate 40 has a function to uniformly diffuse incident light. The light diffusion plate 40 is positioned so as to face the second surface of the substrate 10.

The protection film 19 is composed of an organic insulation film such as a polyimide film or an inorganic insulation film such as a silicon oxide film. The protection film 19 is formed on the first surface of the substrate 10 so as to cover the LEDs 11, the anode electrodes 14 and the cathode electrodes 15 formed on the substrate 10. In this regard, the anode driver IC 31 and the cathode driver IC 32 are disposed on the first surface of the substrate 10 outside the protection film 19.

The heat releasing plate 60 is made of metal such as aluminum. The thermally-conductive adhesive agent 50 composed of silicone resin or the like is coated on the surface of the heat releasing plate 60. The heat releasing plate 60 is bonded to the protection film 19 by means of the adhesive agent 50.

The anode driver IC 31 has a function to supply electric current to the LEDs 11 according to a lighting signal. The anode driver IC 31 includes circuits such as a constant current circuit or an amplifier circuit. The anode wirings 12 are connected to the anode electrodes 14 of the LEDs 11 and are also connected to driving elements of the anode driver IC 31. Although the anode driver IC 31 is provided on the substrate 10 in the example shown in FIG. 2, the anode driver IC 31 is not necessarily provided on the substrate 10, but can be provided on other print circuit board (not shown) or the like.

The cathode driver IC 32 has a function to allow the electric current to flow therein. The cathode driver IC 32 includes switching circuits such as a transistor. The cathode wirings 13 are connected to the cathode electrodes 15 of the LEDs 11 and are also connected to the cathode driver IC 32. Although the cathode driver IC 32 is provided on the substrate 10 in the example shown in FIG. 2, the cathode driver IC 32 is not necessarily provided on the substrate 10, but can be provided on other print circuit board (not shown) or the like.

Next, a process for providing the LED 11 on the substrate 10 will be described.

Figure 5:
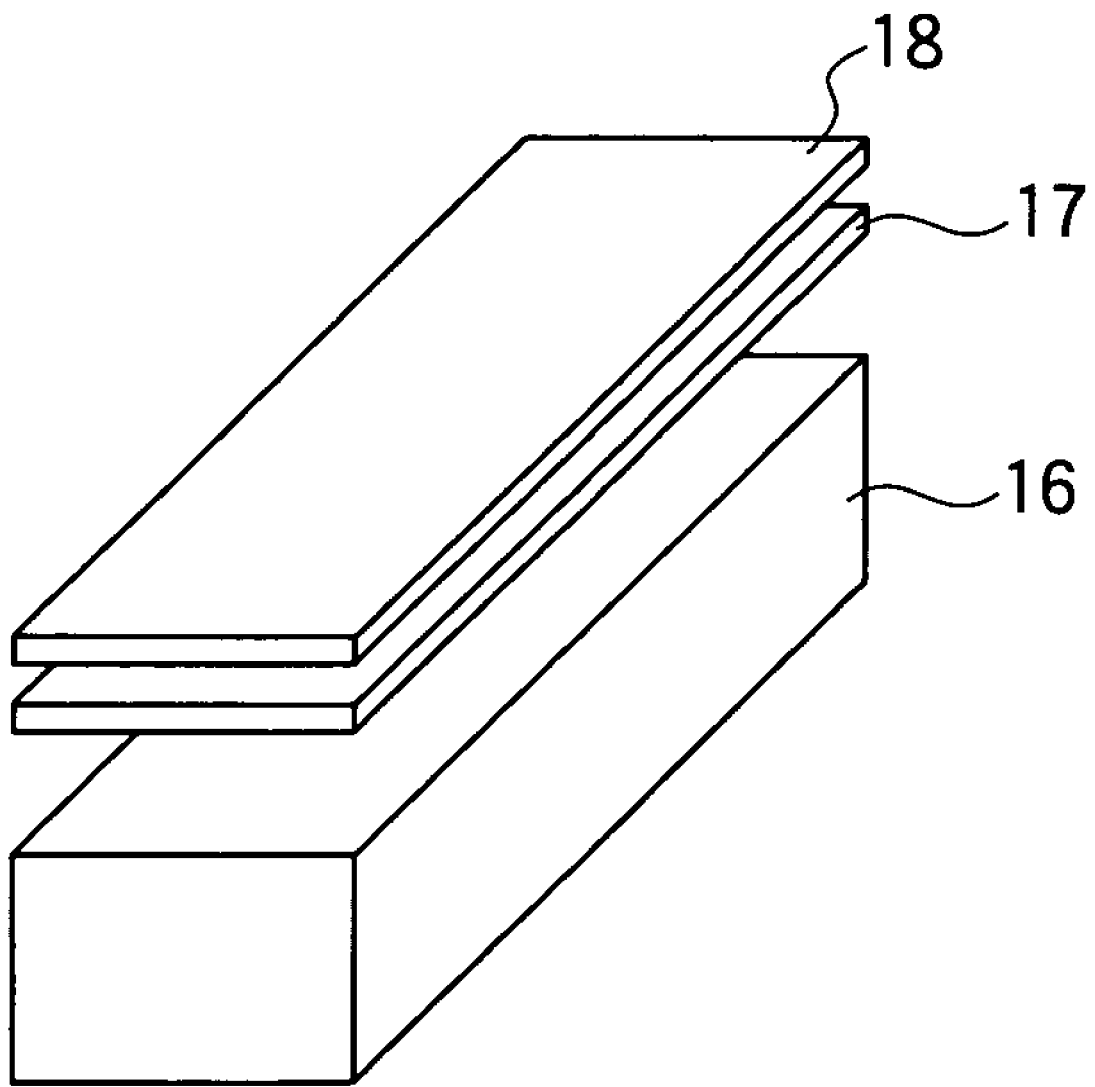
FIG. 5 is a schematic view showing a process for peeling an LED thin-film according to the first embodiment of the present invention.
Figure 6:
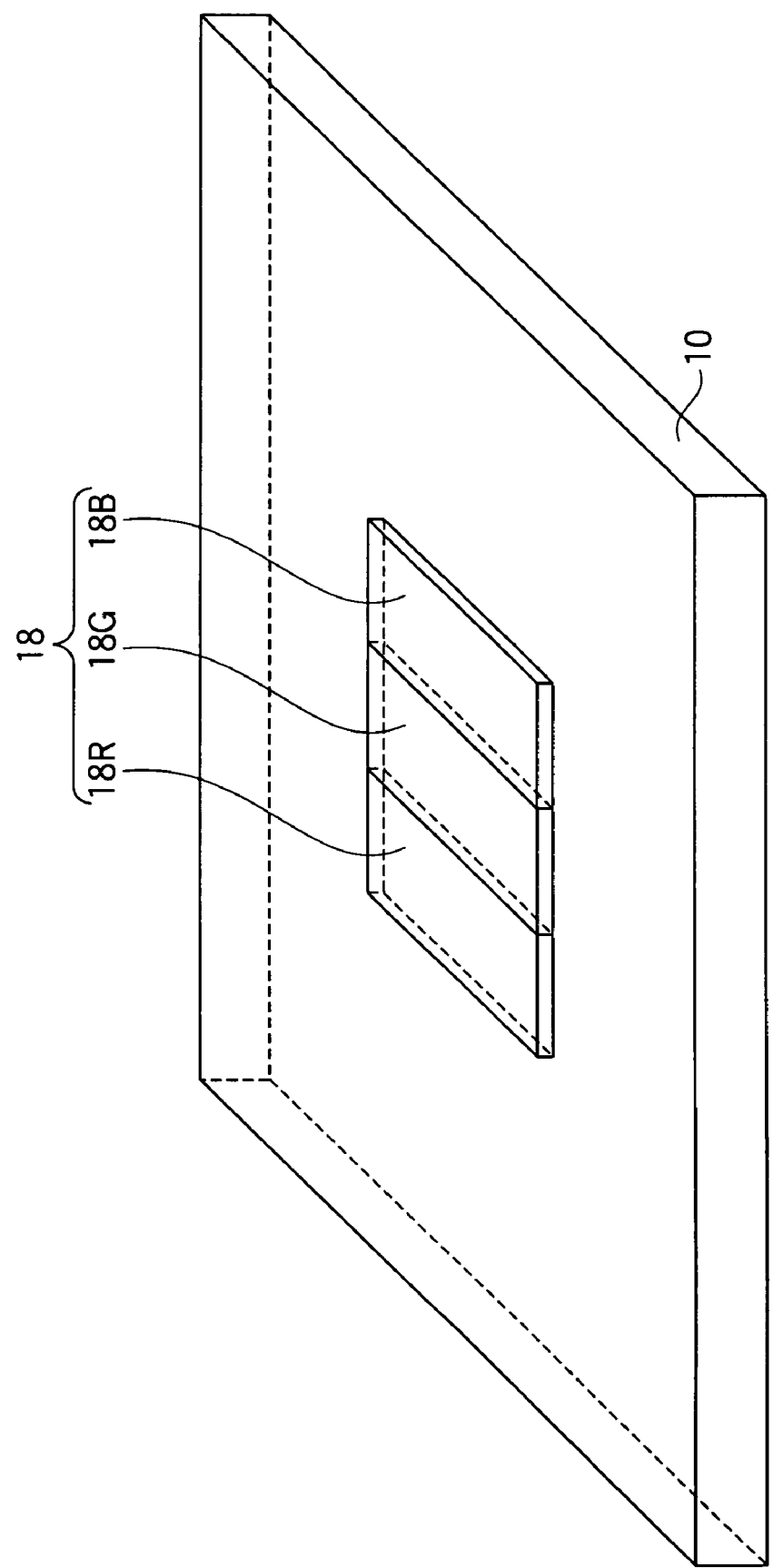
FIG. 6 is a schematic view showing a process for fixing the LED thin-film to a substrate according to the first embodiment of the present invention.

FIG. 5 shows a process for peeling an LED thin-film (for forming the LED 11) according to the first embodiment of the present invention. FIG. 6 shows a process for fixing the LED thin-film to the substrate 10 according to the first embodiment of the present invention.

As shown in FIG. 5, an LED thin-film 18 for forming the LED 11 is in the form of an elongated band or a strip. For example, the LED thin-film 18R for forming the LED 11R (that emits red light) has a layered structure of heterostructure or double-heterostructure composed of a plurality of layers such as aluminum gallium arsenide, aluminum gallium indium arsenide.

A sacrificial layer 17 is provided between a base material 16 and the LED thin-film 18 for peeling (i.e., separating) the LED thin-film 18 from the base material 16. The sacrificial layer 17 is composed of material such as, for example, aluminum arsenide that can easily be etched by an etching solution described later.

The base material 16 is composed of, for example, gallium arsenide, gallium nitride, sapphire or the like. Inorganic material layers forming the LED thin-film 18 are epitaxially grown on the base material 16 using a vapor-phase growth method such as an MOCVD method.

Next, a process for peeling the LED thin-film 18 from the base material 16 will be described.

If the combination of the LEDs 11R, 11G and 11B forms, for example, a square having each side of 20 mm in length, the LED thin-film 18 is formed into a strip shape having a length longer than 20 mm and a width wider than ⅓ of 20 mm. In this case, the LED thin-film 18 is formed into a strip shape using an etching solution such as a solution containing phosphoric acid, hydrogen peroxide and water ($H_3PO_4:H_2O_2:H_2O$) or the like, by means of a photolithographic etching technique broadly used in a semiconductor manufacturing process.

Then, the base material 16 on which the LED thin-film 18 is formed is immersed in an etching solution such as hydrogen fluoride solution, hydrochloric acid solution or the like. With this, the sacrificial surface 17 is etched (removed), and the LED thin-film 18 is peeled off from the base material 16.

Next, the LED thin-film 18 (having been peeled off from the base material 16) is pressed against the planarized surface of the substrate 10, and the substrate 10 and the LED thin-film 18 are fixed to each other by means of intermolecular force and integrated with each other.

The surface layer 10a (FIG. 1) of the substrate 10 is composed of an organic insulation film such as a polyimide film or an inorganic insulation film such as a silicon oxide film, and preferably has a flat surface whose surface accuracy is less than or equal to several tens of nanometers having no concaves or convexes. Since the surface of the substrate 10 is such a flat surface having no concave or convex, the bonding between the LED thin-film 18 and the substrate 10 by means of intermolecular force (such as hydrogen bonding or the like) can be easily achieved.

These processes are repeated, so that a plurality of columns (for example, three columns) of the LED thin-films 18R, 18G and 18B are fixed to the substrate 10 as shown in FIG. 6, and the LED thin-films 18R, 18G and 18B are integrated with the substrate 10.

Subsequently, connecting portions for the anode electrodes 14 and the cathode electrodes 15 are formed on the LED thin-films 18 (having been fixed to the substrate 10) using, for example, a photolithographic etching method by means of an etching solution containing phosphoric acid, hydrogen peroxide and water ($H_3PO_4:H_2O_2:H_2O$). Then, the anode electrodes 14, the cathode electrodes 15, the anode wirings 12 (connected to the anode electrodes 14) and the cathode wirings 13 (connected to the cathode electrodes 15) are formed using a deposition, a photolithographic etching method or a lift-off method. Furthermore, the anode driver IC 31 and the cathode driver IC 32 are mounted on the substrate 10, and the anode wirings 12 and the cathode wirings 13 are respectively connected to the anode driver IC 31 and the cathode driver IC 32.

In the above description, each LED thin-film 18 has a strip shape so as to form the LEDs 11R, 11G and 11B whose combination forms a square having each side of 20 mm in length. However, the length of the combination of the LEDs 11R, 11G and 11B is not limited to 20 mm, and the LEDs 11R, 11G and 11B can be of any shape such as an elongated rectangle, a circle or an ellipse. Further, in the above description, the LED thin-films 18 for forming the LEDs 11R, 11G and 11B have the same dimensions. However, the LED thin-films 18 for forming the LEDs 11R, 11G and 11B can have different dimensions according to coloration or weighing of respective colors. Further, the LED thin-film 18 can be of any shape such as a triangle, a square, a polygon, a circle or an ellipse.

Furthermore, in the above description, the LEDs 11R, 11G and 11B are provided one for each color. However, it is possible to provide two or more LEDs 11R, 11G and 11B for each color according to a required light intensity or a size of the LED backlight device 100. Further, the number of anode wirings 12 and the cathode wirings 13 can be increased according to the number of the LEDs 11R, 11G and 11B.

Next, the operation of the above configured LED backlight device 100 will be described.

A lighting signal is sent from a superior device (such as a not shown personal computer) and is inputted to the anode driver IC 31. Upon receiving the lighting signal, the amplifier circuit of the anode driver IC 31 applies stable currents of different current values to the anode electrodes 14 of the LEDs 11R, 11G and 11B via the anode wirings 12. In this regard, the current values are determined so that the mixture of the lights emitted by the LEDs 11R, 11G and 11B forms white light. When the lighting signal is inputted to the cathode driver IC 32, the cathode driver IC 32 allows the currents to flow therein from the cathode electrodes 15 of the LEDs 11R, 11G and 11B through the cathode wirings 13 via the switching circuit, so that the LEDs 11R, 11G and 11B emit lights. The lights emitted by the LEDs 11R, 11G and 11B are incident on the light diffusion plate 40 as shown by arrows A in FIG. 1. The lights of the respective colors are uniformly diffused in the light diffusion plate 40, and white light is emitted by the light diffusion plate 40 as shown by arrows B in FIG. 1. The LCD panel 200 provided facing the LED backlight device 10 is illuminated by the white light emitted by the light diffusion plate 40.

In this case, the heat generated by the emission of the LEDs 11R, 11G and 11B is diffused via the protection film 19, the thermally-conductive adhesive agent 50 and the heat releasing plate 60, and therefore the temperatures of the substrate 10 and the light diffusion plate 40 do not substantially increase.

As described above, according to the first embodiment, the light diffusion plate 40 is provided facing the second surface of the substrate 10 (opposite to the first surface to which the LEDs 11 are fixed). Further, the LEDs 11, the anode wirings 12 and the cathode wirings 13 are formed using the semiconductor process, and the LEDs 11 are connected to the anode wirings 12 and the cathode wirings 13 using the semiconductor process. Therefore, a thin and high-intensity LED backlight device can be obtained.

Second Embodiment

Next, the second embodiment of the present invention will be described. Components of the second embodiment that are the same as those of the first embodiment are assigned the same reference numerals, and descriptions thereof are omitted. Further, descriptions of the operations and advantages that are same as those of the first embodiment are omitted.

Figure 7:
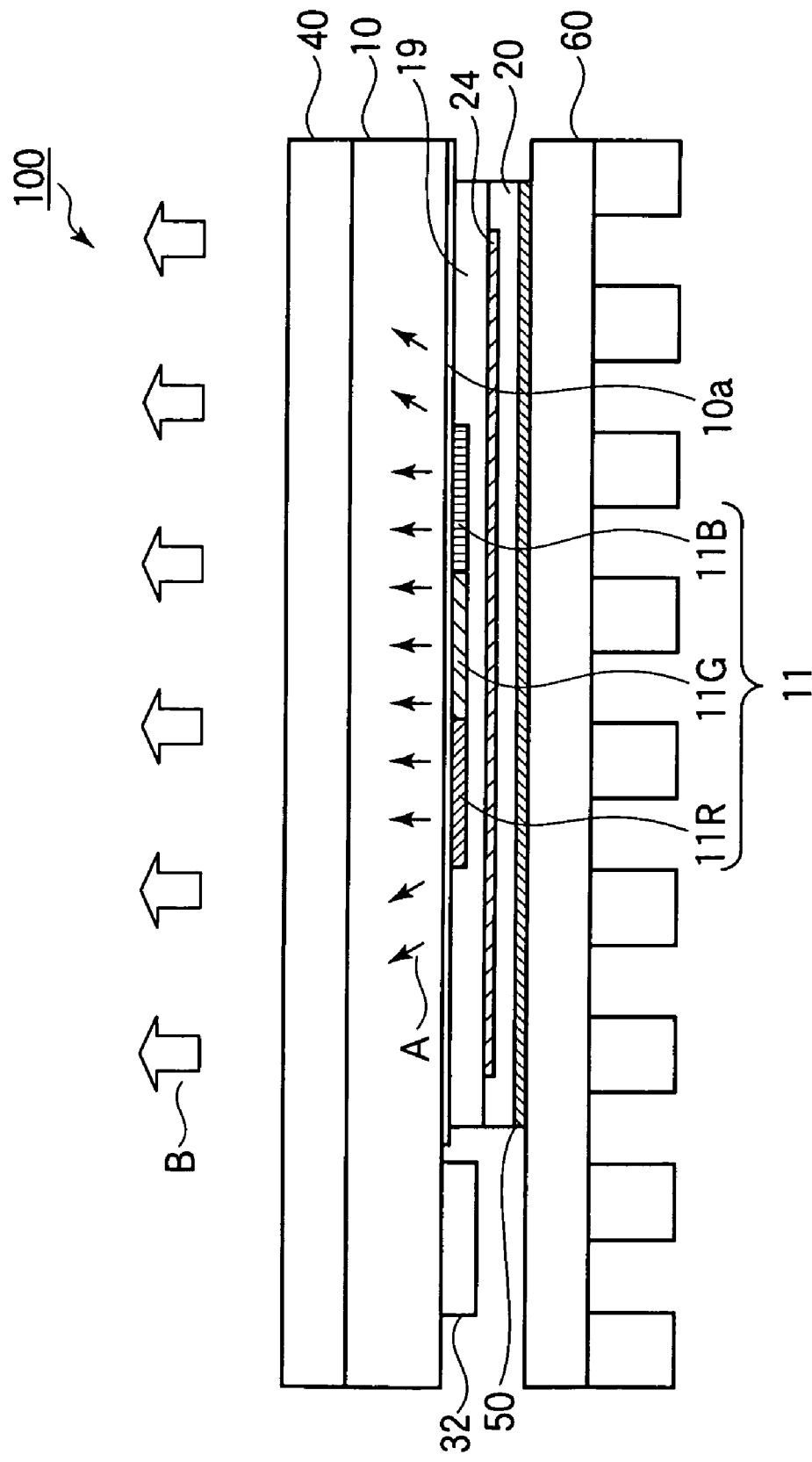
FIG. 7 is a side sectional view showing an LED backlight device according to the second embodiment of the present invention.

FIG. 7 is a side sectional view showing the LED backlight device according to the second embodiment of the present invention.

In the second embodiment, the LED backlight device 100 has a reflection film 24 that reflects light emitted by the LEDs 11. To be more specific, the reflection film 24 is formed on the protection film 19 (fixed to the first surface of the substrate 10) to cover the LEDs 11. A second protection film 20 is formed so as to entirely cover the reflection film 24.

As was described in the first embodiment, the protection film 19 composed of an organic insulation film (such as a polyimide film) or an inorganic insulation film (such as a silicon oxide film) is formed so as to cover the LEDs 11, the anode electrodes 14 and the cathode electrodes 15 respectively formed on the substrate 10. The anode driver IC 31 and the cathode driver IC 32 are disposed on the first surface of the substrate 10 outside the protection film 19. In this regard, the anode electrodes 14, the cathode electrodes 15, the anode wirings 12, the cathode wirings 13 and the anode driver IC 31 (see FIG. 2) are omitted in FIG. 7.

The reflection film 24 is provided for reflecting lights of respective colors emitted by the back surfaces (i.e., lower surfaces in FIG. 7) of the LEDs 11. The reflection film 24 is formed by forming a metal film composed of gold or aluminum, or a layered metal film composed of gold or aluminum layered with nickel, titan or the like on the surface of the substrate 10, and patterning the metal film.

The second protection film 20 is composed of an organic insulation film such as a polyimide film or an inorganic insulation film such as a silicon oxide film, and is formed on the reflection film 24.

Further, as was described in the first embodiment, the heat releasing plate 60 made of metal such as aluminum (on which the thermally-conductive adhesive agent 50 composed of silicone resin or the like is coated) is bonded to the second protection film 20 by means of the adhesive agent 50.

Other components of the LED backlight device 100 of the second embodiment are the same as those of the first embodiment, and description thereof are omitted.

Next, the operation of the LED backlight device 100 of the second embodiment will be described.

A lighting signal is sent from a superior device (such as a not shown personal computer) and is inputted to the anode driver IC 31. Upon receiving the lighting signal, the amplifier circuit of the anode driver IC 31 applies stable currents of different current values to the anode electrodes 14 of the LEDs 11R, 11G and 11B via the anode wirings 12. In this regard, the current values are determined so that the mixture of the lights emitted by the LEDs 11R, 11G and 11B forms white light. When the lighting signal is inputted to the cathode driver IC 32, the cathode driver IC 32 allows the currents to flow therein from the cathode electrodes 15 of the LEDs 11R, 11G and 11B through the cathode wirings 13 via the switching circuit, so that the LEDs 11R, 11G and 11B emit lights. The lights emitted from the back surfaces (i.e., the lower surfaces in FIG. 7) of the LEDs 11R, 11G and 11B are reflected by the reflection film 24, and are incident on the light diffusion plate 40 as well as the lights emitted from the main surfaces (i.e., the upper surfaces in FIG. 7) of the LEDs 11R, 11G and 11B as shown by arrows A in FIG. 1. The lights of the respective colors are uniformly diffused in the light diffusion plate 40, and white light is emitted by the light diffusion plate 40 as shown by arrows B in FIG. 7.

In this case, the heat generated by the emission of the LEDs 11R, 11G and 11B is diffused via the protection film 19, the second protection film 20, the reflection film 24, the thermally-conductive adhesive agent 50 and the heat releasing plate 60, and therefore the temperatures of the substrate 10 and the light diffusion plate 40 do not substantially increase.

As described above, according to the second embodiment, the reflection film 24 is provided on the protection film 19 so as to cover the LEDs 11. Further, the LEDs 11, the anode wirings 12 and the cathode wirings 13 are formed using the semiconductor process, and the LEDs 11 are connected to the anode wirings 12 and the cathode wirings 13 using the semiconductor process. Accordingly, a thin LED backlight device 100 having higher light intensity compared with the first embodiment can be obtained.

Third Embodiment

Next, the third embodiment of the present invention will be described. Components of the third embodiment that are the same as those of the first or second embodiment are assigned the same reference numerals, and descriptions thereof are omitted. Further, descriptions of the operations and advantages that are same as those of the first or second embodiment are omitted.

Figure 8:
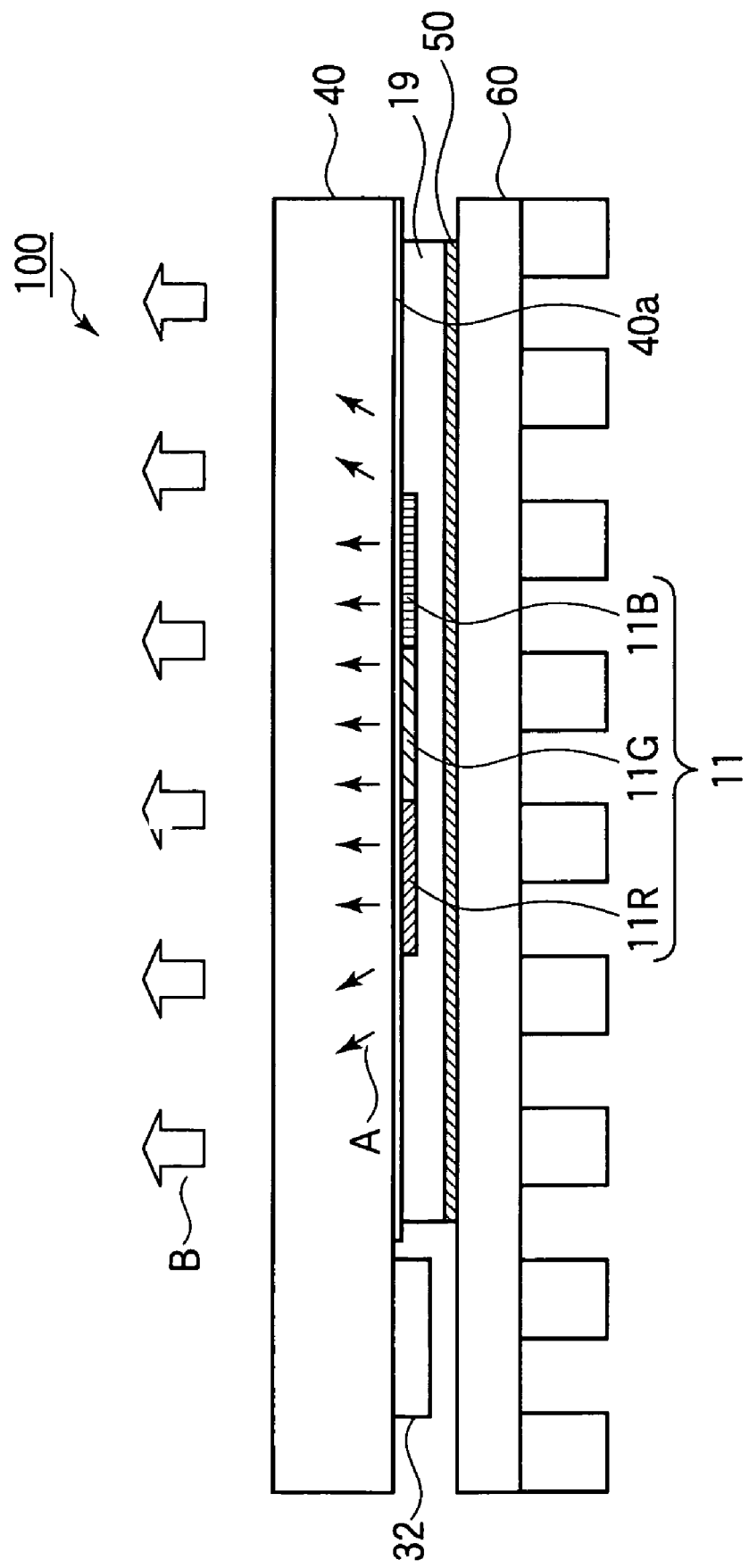
FIG. 8 is a side sectional view showing an LED backlight device according to the third embodiment of the present invention.

FIG. 8 is a side sectional view showing the LED backlight device according to the third embodiment of the present invention.

In the third embodiment, the substrate 10 (see FIG. 1) is not provided. Instead, the LED backlight device 100 has the light diffusion plate 40 (i.e., the first substrate) in the form of a flat plate. The light diffusion plate 40 is composed of polymer material such as polycarbonate or polyethylene terephthalate having optical transparency, and has a function to uniformly diffuse incident light.

The substrate 40 has a surface layer 40a composed of an organic insulation film (such as polyimide film) or an inorganic insulation film, as is the case with the surface layer 10a (see FIG. 1) of the first embodiment. The surface layer 40a is planarized so that the surface accuracy is several tens of nanometers or less. The LED 11R that emits red light, the LED 11G that emits green light, and the LED 11B that emits blue light are layered thin-films. The LEDs 11R, 11G and 11B are peeled off from another substrate, and are fixed to the substrate 40 by means of intermolecular force such as hydrogen bonding so as to be integrated with the substrate 40 using the processes as described in the first embodiment.

The anode driver IC 31 and the cathode driver IC 32 for driving the LED 11 are disposed on a first surface (i.e., a lower surface) of the light diffusion plate 40. The anode electrodes 14, the cathode electrodes 15, the anode wirings 12 and the cathode wirings 13 (see FIG. 2) are formed on the first surface of the light diffusion plate 40 using the process as was described in the first embodiment. In this regard, the anode electrodes 14, the cathode electrodes 15, the anode wirings 12 and the cathode wirings 13 are omitted in FIG. 8.

The protection film 19 composed of an organic insulation film (such as a polyimide film) or an inorganic insulation film (such as a silicon oxide film) is formed so as to cover the LEDs 11, the anode electrodes 14 and the cathode electrodes 15 respectively formed on the light diffusion plate 40. The anode driver IC 31 and the cathode driver IC 32 are disposed on the first surface of the light diffusion plate 40 outside the protection film 19.

The heat releasing plate 60 made of metal such as aluminum (on which the thermally-conductive adhesive agent 50 composed of silicone resin or the like is coated) is bonded to the protection film 19 by means of the adhesive agent 50, as was described in the first embodiment.

Other components of the LED backlight device 100 of the third embodiment are the same as those of the first embodiment, and descriptions thereof are omitted.

Next, the operation of the LED backlight device 100 of the third embodiment will be described.

A lighting signal is sent from a superior device (such as a not shown personal computer) and is inputted to the anode driver IC 31. Upon receiving the lighting signal, the amplifier circuit of the anode driver IC 31 applies stable currents of different current values to the anode electrodes 14 of the LEDs 11R, 11G and 11B via the anode wirings 12. In this regard, the current values are determined so that the mixture of the lights emitted by the LEDs 11R, 11G and 11B forms white light. When the lighting signal is inputted to the cathode driver IC 32, the cathode driver IC 32 allows the currents to flow therein from the cathode electrodes 15 of the LEDs 11R, 11G and 11B through the cathode wirings 13 via the switching circuit, so that the LEDs 11R, 11G and 11B emit lights. The lights emitted by the LEDs 11R, 11G and 11B are incident on the light diffusion plate 40 as shown by arrows A in FIG. 8. The lights of the respective colors are uniformly diffused in the light diffusion plate 40, and white light is emitted by the light diffusion plate 40 as shown by arrows B in FIG. 8.

In this case, the heat generated by the emission of the LEDs 11R, 11G and 11B is diffused via the protection film 19, the thermally-conductive adhesive agent 50 and the heat releasing plate 60, and therefore the temperature of the light diffusion plate 40 does not substantially increase.

As described above, according to the second embodiment, the LEDs 11 are directly provided on the surface of the light diffusion plate 40. Further, the LEDs 11, the anode wirings 12 and the cathode wirings 13 are formed using the semiconductor process, and the LEDs 11 are connected to the anode wirings 12 and the cathode wirings 13 using the semiconductor process. Accordingly, an LED backlight device 100 which is lighter, thinner and simpler in structure compared with the first embodiment can be obtained.

Fourth Embodiment

Next, the fourth embodiment of the present invention will be described. Components of the fourth embodiment that are the same as those of the first, second or third embodiment are assigned the same reference numerals, and descriptions thereof are omitted. Further, descriptions of the operations and advantages that are same as those of the first, second or third embodiment are omitted.

Figure 9:
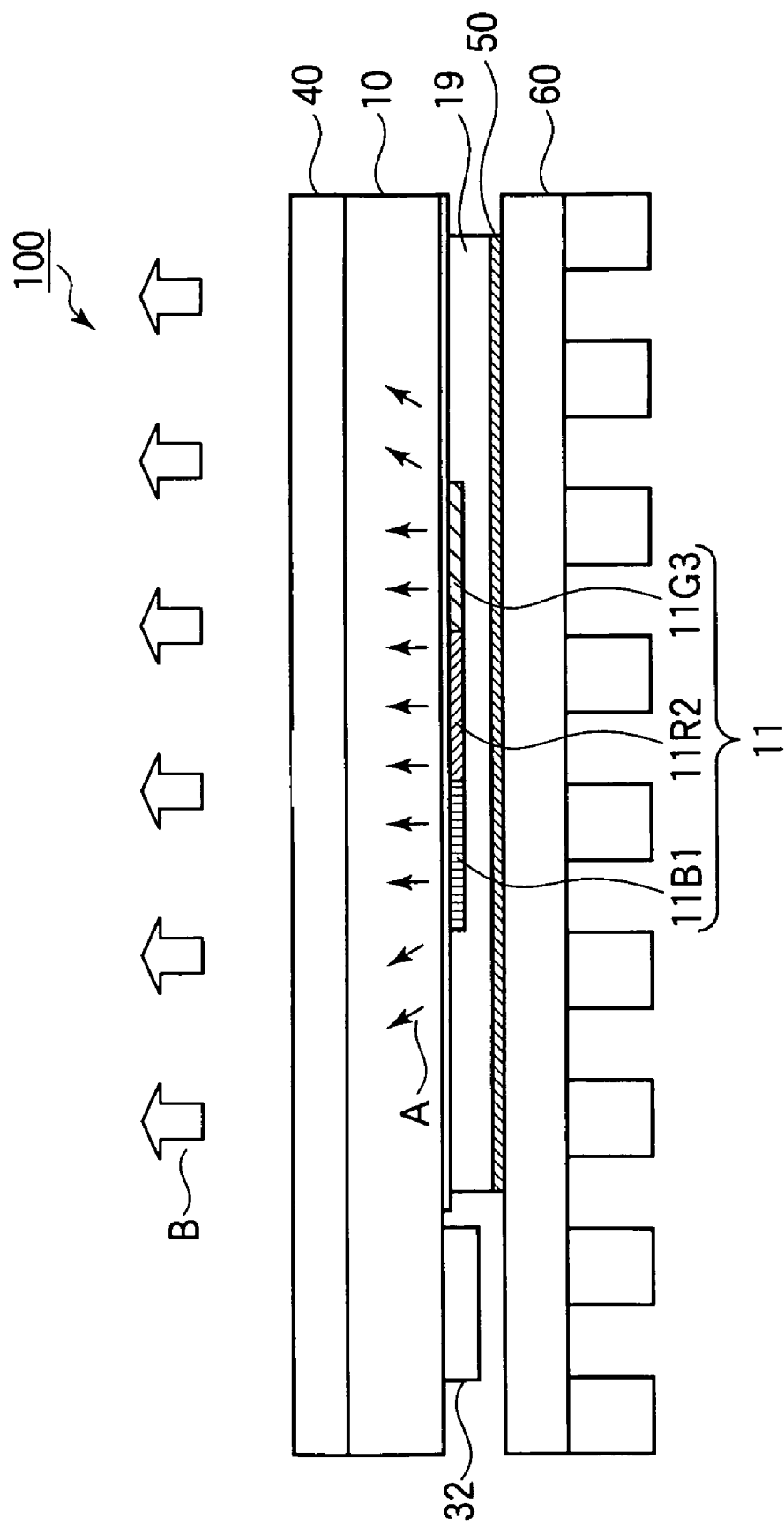
FIG. 9 is a side sectional view showing an LED backlight device according to the fourth embodiment of the present invention.
Figure 10:
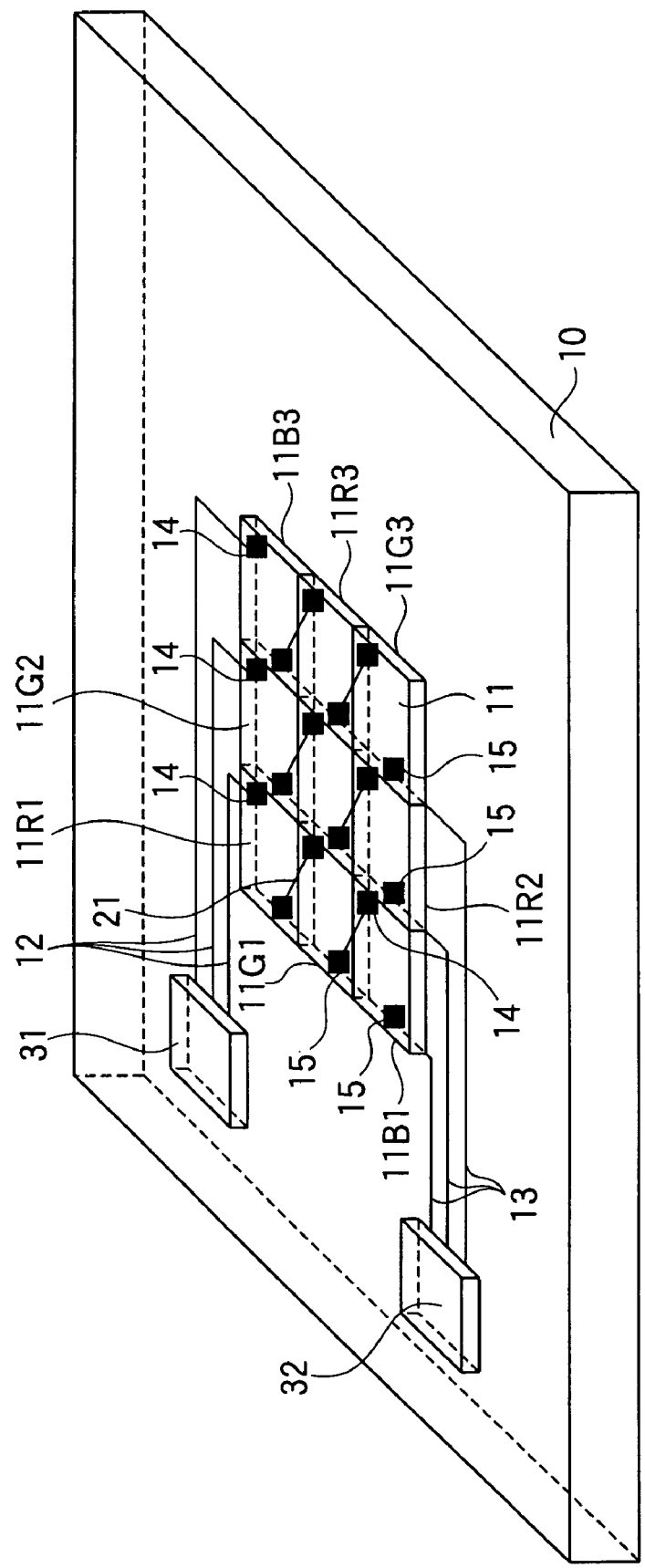
FIG. 10 is a perspective view showing an arrangement of LEDs according to the fourth embodiment of the present invention.
Figure 11:
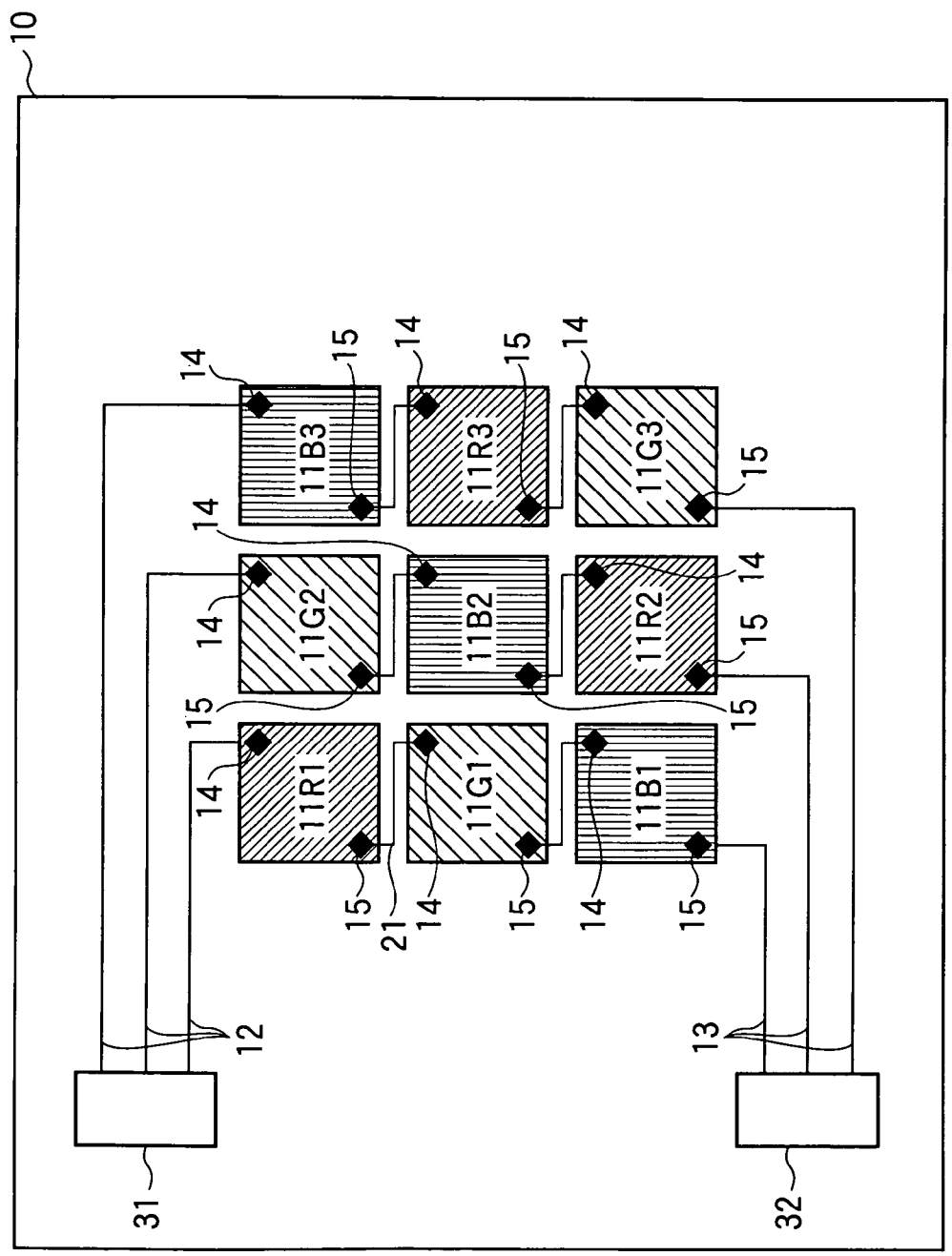
FIG. 11 is a plan view showing the arrangement of the LEDs according to the fourth embodiment of the present invention.
Figure 12:
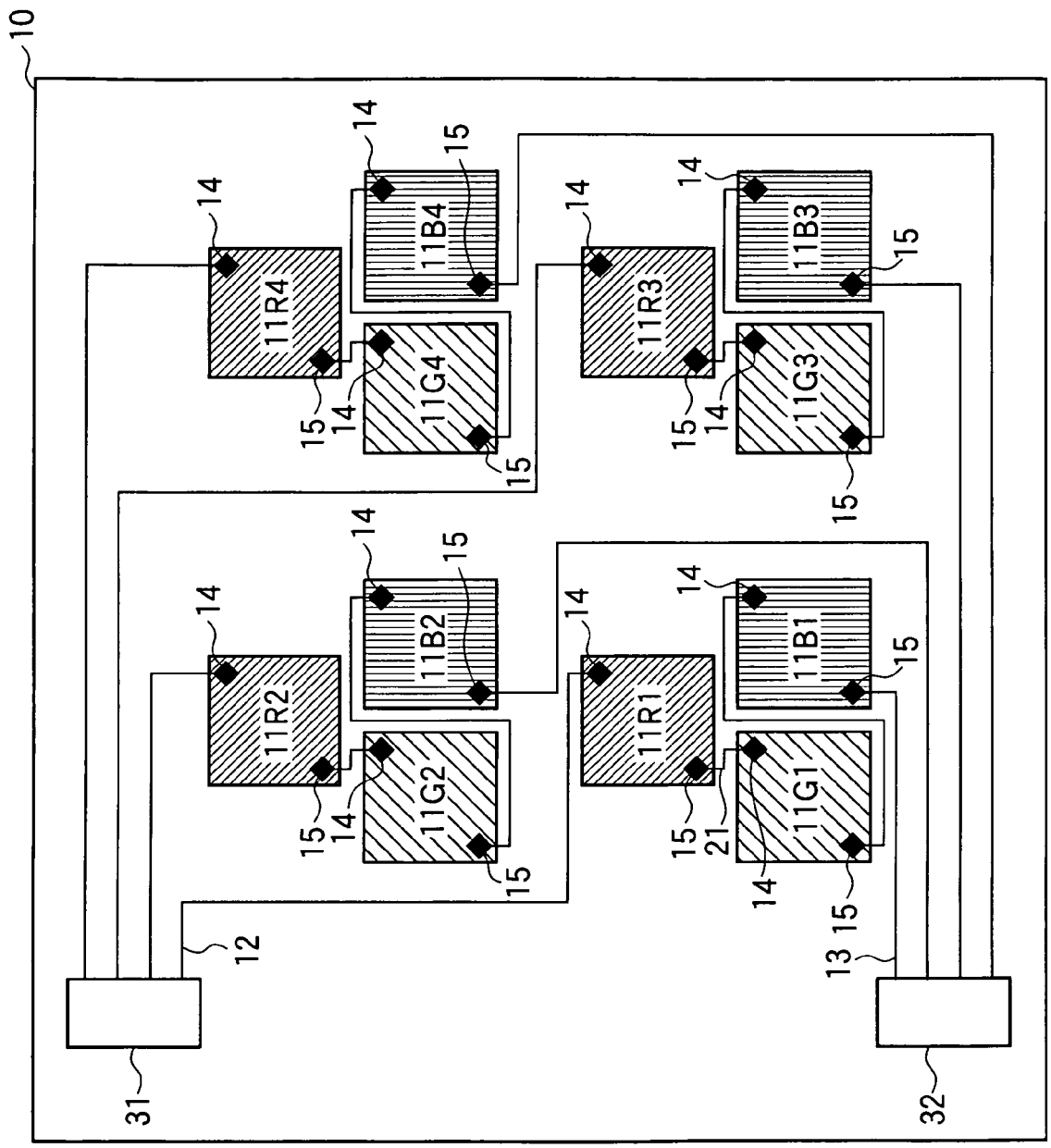
FIG. 12 is a plan view showing another example of the arrangement of the LEDs according to the fourth embodiment of the present invention.

FIG. 9 is a side sectional view showing the LED backlight device according to the fourth embodiment of the present invention. FIG. 10 is a perspective view showing an arrangement of LEDs according to the fourth embodiment of the present invention. FIG. 11 is a plan view showing the arrangement of the LEDs according to the fourth embodiment of the present invention. FIG. 12 is a plan view showing another example of the arrangement of the LEDs according to the fourth embodiment of the present invention.

In the fourth embodiment, the LED backlight device 100 includes the substrate 10 (i.e., the first substrate) in the form of a flat plate and the LEDs 11 (i.e., layered thin-films) fixed to the substrate 10. As shown in FIG. 11, the LEDs 11 include LEDs 11R1, 11R2 and 11R3 that emit red light, LEDs 11G1, 11G2 and 11G3 that emit green light and LEDs 11B1, 11B2 and 11B3 that emit blue light.

The LEDs 11R1, 11R2, 11R3, 11G1, 11G2, 11G3, 11B1, 11B2 and 11B3 are collectively referred to as the LEDs 11. The LEDs 11R1, 11R2 and 11R3 are collectively referred to as the LEDs 11R. The LEDs 11G1, 11G2 and 11G3 are collectively referred to as the LEDs 11G. The LEDs 11B1, 11B2 and 11B3 are collectively referred to as the LEDs 11B.

The number of LEDs 11 can be arbitrarily determined. In this example, the number of LEDs 11 is set to 9 for convenience of graphic illustration. An arranging manner of the LEDs 11 can be arbitrarily determined. In this example, the LEDs 11 are arranged in a grid. To be more specific, the LEDs 11 are arranged in a square grid of 3 rows and 3 columns at constant intervals as shown in FIGS. 10 and 11.

Each column (i.e., group) includes three LEDs 11R, 11G and 11B one for each color which are electrically connected in series. To be more specific, the first column (i.e., the left column in FIG. 11) includes LEDs 11R1, 11G1 and 11B1 electrically connected in series. The second column (i.e., the center column in FIG. 11) includes LEDs 11G2, 11BG2 and 11R2 electrically connected in series. The third column (i.e., the right row in FIG. 11) includes LEDs 11B3, 11R3 and 11G3 electrically connected in series. The anode wirings 12 (whose ends are connected to the anode driver IC 31) are connected to the anode electrodes 14 of endmost LEDs 11 (i.e., the LEDs 11R1, 11G2 and 11B3) closest to the anode driver IC 31 in the respective columns. The cathode wirings 13 (whose ends are connected to the cathode driver IC 32) are connected to the cathode electrodes 15 of opposite endmost LEDs 11 (i.e., the LEDs 11B1, 11R2 and 11G3) farthest from the anode driver IC 31 in the respective columns. In each column, the anode electrode 14 and the cathode electrode 15 of the adjacent LEDs 11 are connected by interconnection wirings 21. In other words, the LEDs 11 of each column are electrically connected in series via the interconnection wirings 21, and the anode electrode 14 and the cathode electrode 15 of the endmost LEDs 11 of each column are connected to the anode driver IC 31 and the cathode driver IC 32 via the anode wirings 12 and the cathode wirings 13.

As shown in FIG. 9, the LED backlight device 100 further includes the light diffusion plate 40 (i.e., the second substrate) formed on the second surface (i.e., the upper surface in FIG. 9) of the substrate 10 opposite to the first surface. The protection film 19 is formed so as to cover the LED 11 fixed to the first surface of the substrate 10. The heat releasing plate 60 is fixed to the surface (i.e., the lower surface in FIG. 9) of the protection film 19 opposite to the LEDs 11 via the thermally-conductive adhesive agent 50.

The substrate 10 is preferably composed of, for example, a quartz or glass substrate having excellent optical transparency, or a resin substrate composed of acryl or the like having optical transparency. The substrate 10 has the surface layer 10a composed of an organic insulation film (such as a polyimide film) or an inorganic insulation film. The surface layer 10a is planarized so that the surface accuracy is several tens of nanometers or less. The LEDs 11R that emit red light, the LEDs 11G that emit green light, and the LEDs 11B that emit blue light are layered thin-films. The LEDs 11R, 11G and 11B are peeled off from another substrate as described later, and are fixed to the substrate 10 by means of intermolecular force such as hydrogen bonding so as to be integrated with the substrate 10.

The LEDs 11R are composed of layered thin-films having heterostructure or double heterostructure formed by epitaxially growing inorganic material such as aluminum gallium arsenide, aluminum gallium indium arsenide or the like. The LEDs 11R are not limited to these materials, but can be composed of any kind of material that emits light having the wavelength in a range from 620 nm to 710 nm. The LEDs 11G are composed of layered thin-films having heterostructure or double heterostructure formed by epitaxially growing inorganic material such as aluminum gallium indium phosphide, gallium phosphide or the like. The LEDs 11G are not limited to these materials, but can be composed of any kind of material that emits light having the wavelength in a range from 500 nm to 580 nm. The LEDs 11B are composed of layered thin-films having heterostructure or double heterostructure formed by epitaxially growing inorganic material such as gallium nitride, gallium indium nitride or the like. The LEDs 11B are not limited to these materials, but can be composed of any kind of material that emits light having the wavelength ranging from 450 nm to 500 nm.

The anode electrodes 14 and the cathode electrodes 15 are metal electrodes composed of gold, aluminum, or layered metal electrodes composed of gold or aluminum layered with nickel, titan or the like. The anode electrodes 14 and the cathode electrodes 15 are respectively connected to anodes and cathodes of the LEDs 11.

The anode wirings 12, the cathode wiring 13 and the interconnection wirings 21 are metal wirings composed of gold, aluminum, or layered metal wirings composed of gold or aluminum layered with nickel, titan or the like. The anode wirings 12 and the cathode wirings 13 are connected to the anode electrodes 14 and the cathode electrodes 15 of the LEDs 11 so that the LED 11R (that emits red light), the LED 11G (that emits green light) and the LED 11B (that emits blue light) of each column are electrically connected one bye one in series.

For example, with regard to the column (i.e., the left column in FIG. 11) in which the LEDs 11R1, 11G1 and 11B1 are aligned in a line, the anode wiring 12 is connected to the anode electrode 14 of the LED 11R1. The cathode electrode 15 of the LED 11R1 is connected to the anode electrode 14 of the LED 11G1 by the interconnection wiring 21. The cathode electrode 15 of the LED 11G1 is connected to the anode electrode 14 of the LED 11B1 the interconnection wiring 21. The cathode electrode 15 of the LED 11B1 is connected to the cathode wiring 13. That is, the LEDs 11R1, 11G1 and 11B1 are electrically connected one by one in series. Similarly, with regard to the other columns, the LEDs 11G2, 11B2 and 11R2 arranged in a line are electrically connected one bye one in series, and the LEDs 11B3, 11R3 and 11G3 arranged in a line are electrically connected one by one in series. In this regard, ends of the anode wirings 12 are connected to the anode driver IC 31, and ends of the cathode wirings 13 are connected to the cathode driver IC 32. With such a configuration, the anode electrodes 14 and the cathode electrodes 15 of the respective LEDs 11 are electrically connected to the anode driver IC 31 and the cathode driver IC 32 via the anode wirings 12, the cathode wirings 13 and the interconnection wirings 21.

In the example shown in FIGS. 10 and 11, 9 LEDs 11 are arranged in a grid of 3 rows and 3 columns at constant intervals. However, the number and the arranging manner of the LEDs 11 can be modified according to the required brightness and the size of the LED backlight device 100. For example, as shown in FIG. 12, it is also possible to arrange 12 LEDs 11R, 11G and 11B into four groups (islands) each of which includes 3 LEDs 11R, 11G and 11B arranged to form a triangle.

In this case, with regard to the group of the LEDs 11R1, 11G1 and 11B1 arranged to form a triangle, the anode electrode 14 of the LED 11R1 is connected to the anode wiring 12. Further, the cathode electrode 15 of the LED 11R1 is connected to the anode electrode 14 of the LED 11G1 via the interconnection wiring 21. The cathode electrode 15 of the LEDs 11G1 is connected to the anode electrode 14 of the LED 11B1 via the interconnection wiring 21. The cathode electrode 15 of the LED 11B1 is connected to the cathode wiring 13. In other words, the LEDs 11R1, 11G1 and 11B1 are electrically connected one by one in series. Similarly, with regard to the other groups, the LEDs 11G2, 11B2 and 11R2 arranged to form a triangle are electrically connected one bye one in series, and the LEDs 11B3, 11R3 and 11G3 arranged to form a triangle are electrically connected one by one in series. In this regard, ends of the anode wirings 12 are connected to the anode driver IC 31, and ends of the cathode wirings 13 are cathode driver IC 32. With such a configuration, the anode electrodes 14 and the cathode electrodes 15 of the respective LEDs 11 are electrically connected to the anode driver IC 31 and the cathode driver IC 32 via the anode wirings 12, the cathode wirings 13 and the interconnection wirings 21.

The LED backlight device 100 includes a light diffusion plate 40 in the form of a flat plate. The light diffusion plate 40 is formed of a plastic substrate having optical transparency. To be more specific, the light diffusion plate 40 is composed of a polymer material such as polycarbonate or polyethylene terephthalate, and has a function to uniformly diffuse incident light.

The protection film 19 is composed of an organic insulation film such as a polyimide film or an inorganic insulation film such as a silicon oxide film. The protection film 19 is formed on the first surface of the substrate 10 so as to cover the LEDs 11, the anode electrodes 14 and the cathode electrodes 15 respectively formed on the substrate 10. In this regard, the anode driver IC 31 and the cathode driver IC 32 are disposed on the first surface of the substrate 10 outside the protection film 19.

The heat releasing plate 60 made of metal such as aluminum (on which the thermally-conductive adhesive agent 50 composed of silicone resin or the like is coated) is bonded to the protection film 19 by means of the adhesive agent 50.

The anode driver IC 31 has a function to supply electric current to the LED 11 according to a lighting signal. The anode driver IC 31 includes circuits such as a constant current circuit or an amplifier circuit. The anode wirings 12 are connected to the anode electrodes 14 of the LEDs 11 and are also connected to driving elements of the anode driver IC 31. Although the anode driver IC 31 is provided on the substrate 10 in the examples shown in FIGS. 11 and 12, the anode driver IC 31 is not necessarily provided on the substrate 10, but can be provided on other print circuit board (not shown) or the like.

The cathode driver IC 32 has a function to allow the electric current to flow therein. The cathode driver IC 32 includes switching circuits such as transistor. The cathode wirings 13 are connected to the cathode electrodes 15 of the LEDs 11 and are also connected to the cathode driver IC 32. Although the cathode driver IC 32 is provided on the substrate 10 in the examples shown in FIGS. 11 and 12, the cathode driver IC 32 is not necessarily provided on the substrate 10, but can be provided on other print circuit board (not shown) or the like.

Next, a process for providing the LEDs 11 on the substrate 10 according to the fourth embodiment will be described.

Figure 13:
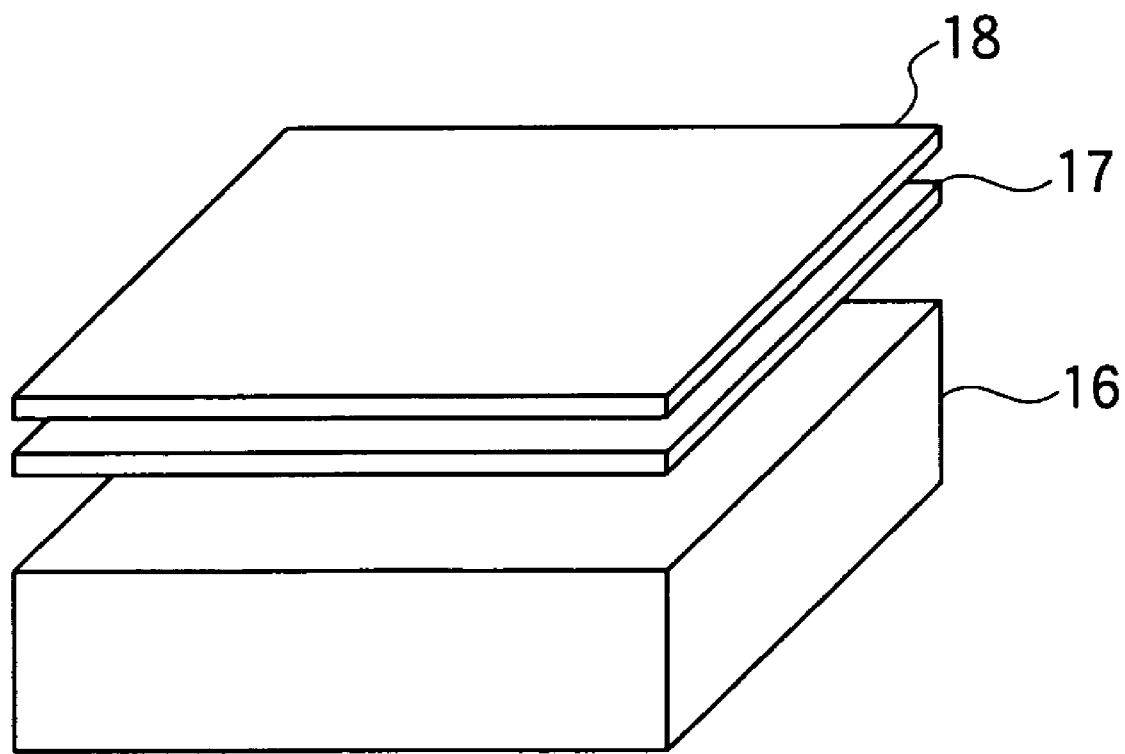
FIG. 13 is a schematic view showing a process for peeling an LED thin-film according to the fourth embodiment of the present invention.
Figure 14:
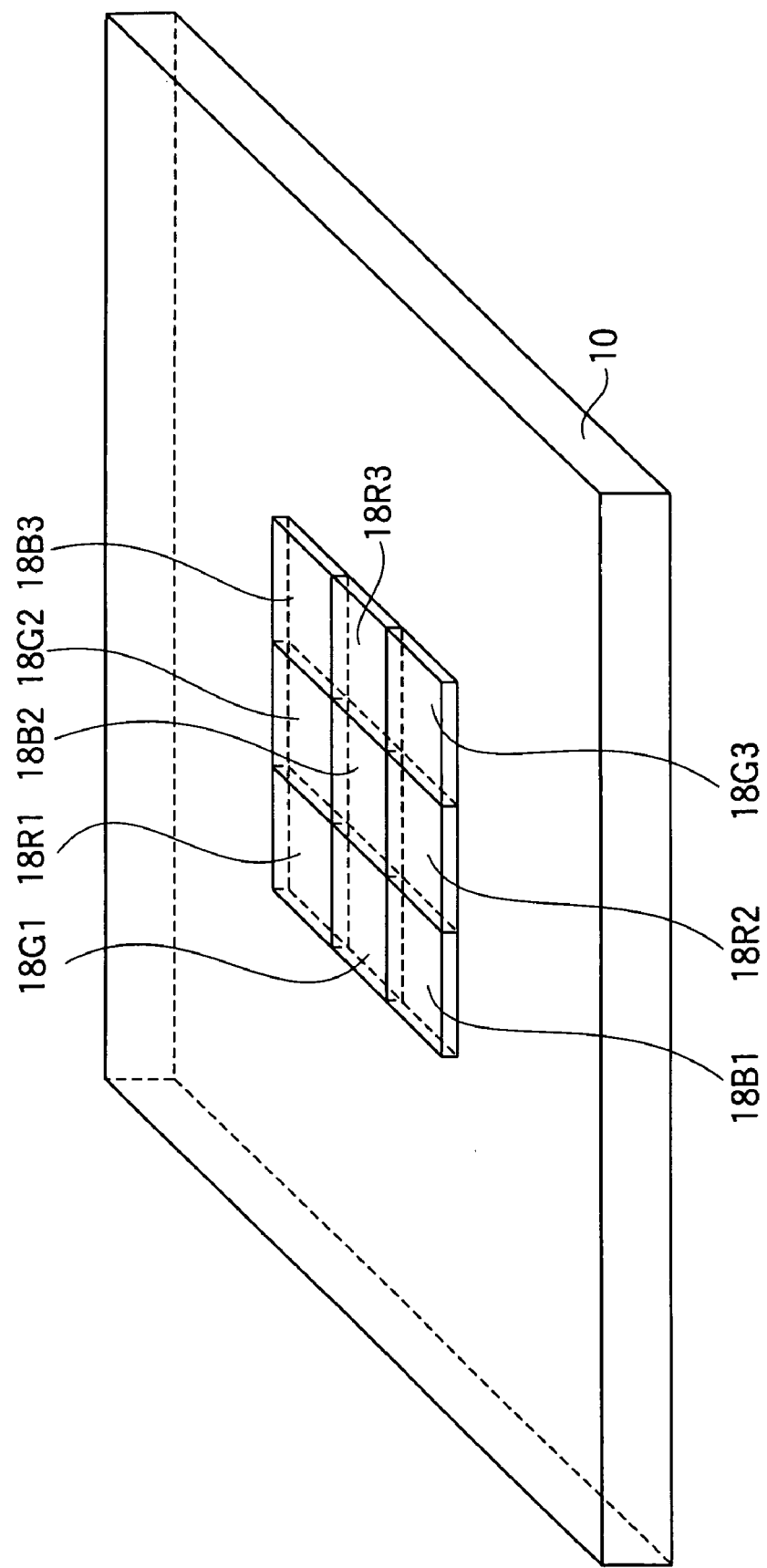
FIG. 14 is a first schematic view showing a process for fixing the LED thin-film to a substrate according to the fourth embodiment of the present invention.
Figure 15:
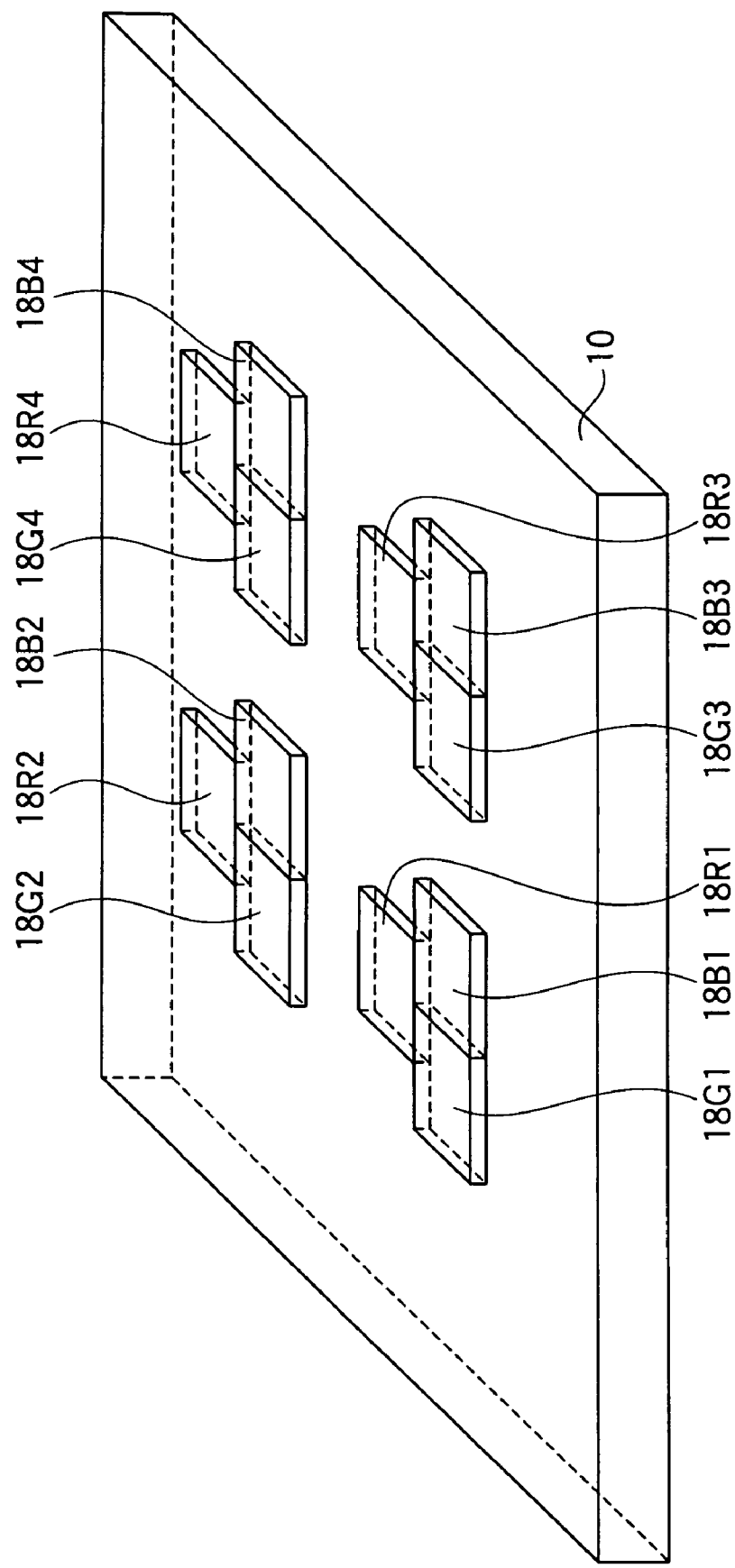
FIG. 15 is a second schematic view showing a process for fixing the LED thin-film to a substrate according to the fourth embodiment of the present invention.

FIG. 13 shows a process for peeling the LED thin-film 18 (the LEDs 11) according to the fourth embodiment of the present invention. FIG. 14 shows a process for fixing the LED thin-film 18 to the substrate 10 according to the fourth embodiment of the present invention. FIG. 15 shows a process for fixing the LED thin-film 18 to the substrate 10 according to another example of the fourth embodiment of the present invention.

As shown in FIG. 13, the LED thin-film 18 is in the form of a rectangular flat plate. For example, the LED thin-film 18R for forming the LED 11R that emits red light has a layered structure of heterostructure or double-heterostructure composed of a plurality of layers such as aluminum gallium arsenide, aluminum gallium indium arsenide.

The sacrificial layer 17 is provided between the base material 16 and the LED thin-film 18 for peeling (i.e., separating) the LED thin-film 18 from the base material 16. The sacrificial layer 17 is composed of material such as aluminum arsenide that can easily be etched by an etching solution described later.

The base material 16 is composed of, for example, gallium arsenide, gallium nitride, sapphire or the like. Inorganic material layers forming the LED thin-film 18 are epitaxially grown on the base material 16 using a vapor-phase growth method such as an MOCVD method.

Next, a process for peeling the LED thin-film 18 from the base material 16 will be described.

If each LED 11 forms, for example, a square having each side of 2 mm in length, the LED thin-film 18 is formed into a square shape having each side longer than 2 mm. In this case, the LED thin-film 18 is formed into a square shape using an etching solution such as a solution containing phosphoric acid, hydrogen peroxide and water ($H_3PO_4:H_2O_2:H_2O$) or the like, by means of a photolithographic etching technique broadly used in a semiconductor manufacturing process.

Next, the base material 16 on which the LED thin-film 18 is formed is immersed in an etching solution such as hydrogen fluoride solution, hydrochloric acid solution or the like. With this, the sacrificial surface 17 is etched (removed), and the LED thin-film 18 is peeled off from the base material 16.

Then, the LED thin-film 18 (having been peeled off from the base material 16) is pressed against the planarized surface of the substrate 10, and the substrate 10 and the LED thin-film 18 are fixed to each other by means of intermolecular force and integrated with each other.

As was described in the first embodiment, the surface layer 10a of the substrate 10 is composed of an organic insulation film such as a polyimide film or an inorganic insulation film such as a silicon oxide film, and preferably has a flat surface whose surface accuracy is less than or equal to several tens of nanometers having no concaves or convexes. Since the surface of the substrate 10 is such a flat surface having no concave or convex, the bonding between the LED thin-film 18 and the substrate 10 by means of intermolecular force (such as hydrogen bonding or the like) can be easily achieved.

These processes are repeated, so that the LED thin-films 18R1, 18R2, 18R3 (18R4), 18G1, 18G2, 18G3 (18G4), 18B1, 18B2, 18B3 (18B4) are fixed to the substrate 10 and arranged in a plurality of columns, to be more specific, in a square grid of 3 rows and 3 columns as shown in FIG. 14, or arranged to form triangles as shown in FIG. 15.

Subsequently, connecting portions for the anode electrodes 14 and the cathode electrodes 15 are formed on the LED thin-films 18 (having been fixed to the substrate 10) using, for example, a photolithographic etching method by means of an etching solution containing phosphoric acid, hydrogen peroxide and water ($H_3PO_4$:$H_2O_2$:$H_2O$). Further, the anode electrodes 14, the cathode electrodes 15, the anode wirings 12 (connected to the anode electrodes 14) and the cathode wirings 13 (connected to the cathode electrodes 15) are formed using a deposition, a photolithographic etching method or a lift-off method. Furthermore, the anode driver IC 31 and the cathode driver IC 32 are mounted on the substrate 10, and the anode wirings 12 and the cathode wirings 13 are respectively connected to the anode driver IC 31 and the cathode driver IC 32.

In the above description, each LED thin-film 18 has a square shape having each side of 2 mm in length. However, the length of the side of the LED thin-film 18 is not limited to 2 mm. Further, the LED thin-films 18 for forming the LEDs 11R, 11G and 11B can have different dimensions according to coloration or weighing of respective colors. The LED thin-film 18 can be of any shape such as a triangle, a square, a polygon, a circle or an ellipse.

Next, the operation of the LED backlight device 100 according to the fourth embodiment will be described.

A lighting signal is sent from a superior device (such as a not shown personal computer) to the anode driver IC 31, for activating the groups of LEDs each of which includes the LEDs 11R, 11G and 11B electrically connected one by one in series. Upon receiving the lighting signal, the amplifier circuit of the anode driver IC 31 applies stable currents of different current values to the anode electrodes 14 of the first LEDs 11 of the respective groups via the anode wirings 12. When the lighting signal is inputted to the cathode driver IC 32, the cathode driver IC 32 allows the currents to flow therein from the cathode electrodes 15 of the third LEDs 11 of the respective groups through the cathode wirings 13 via the switching circuit, so that the LEDs 11R, 11G and 11B emit lights. With this, currents flow from the anode driver IC 31 to the cathode driver IC 32 via three LEDs 11 of each group (electrically connected one by one in series), and the LEDs 11 of the respective colors emit lights.

In this case, since the LED 11R that emits red light, the LED 11G that emits green light and the LED 11B that emits blue light are electrically connected in series in each group, the LEDs 11 of three colors can be driven at the same supply voltages and under the same current conditions, as long as piece-to-piece variation of the LED can be neglected.

Further, the heat generated by the emission of the LEDs 11R, 11G and 11B is diffused via the protection film 19, the thermally-conductive adhesive agent 50 and the heat releasing plate 60, and therefore the temperatures of the substrate 10 and the light diffusion plate 40 do not substantially increase.

As described above, according to the fourth embodiment, a plurality of groups of the LEDs 11 are provided, and each group includes the LED 11R (that emits red light), the LED 11G (that emits green light) and the LED 11B (that emits blue light) which are electrically connected in series. Further, the LEDs 11, the anode wirings 12 and the cathode wirings 13 are formed using the semiconductor process, and the LEDs 11 are connected to the anode wirings 12 and the cathode wirings 13 using the semiconductor process. Accordingly, a thin, large and high-intensity LED backlight device 100 can be obtained using a simpler circuit structure compared with the first embodiment.

Fifth Embodiment

Figure 16:
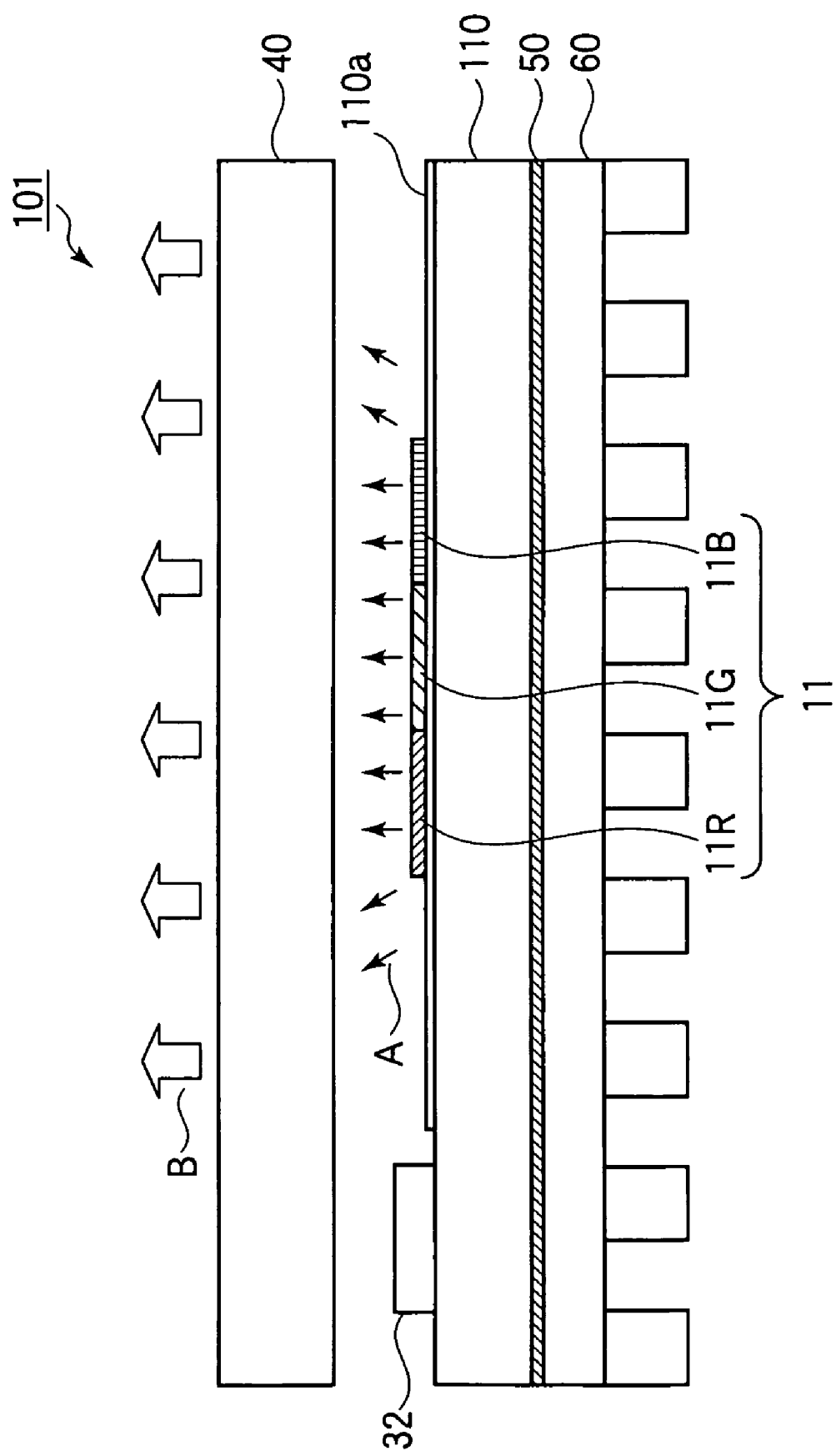
FIG. 16 is a side sectional view showing an LED backlight device according to the fifth embodiment of the present invention.
Figure 17:
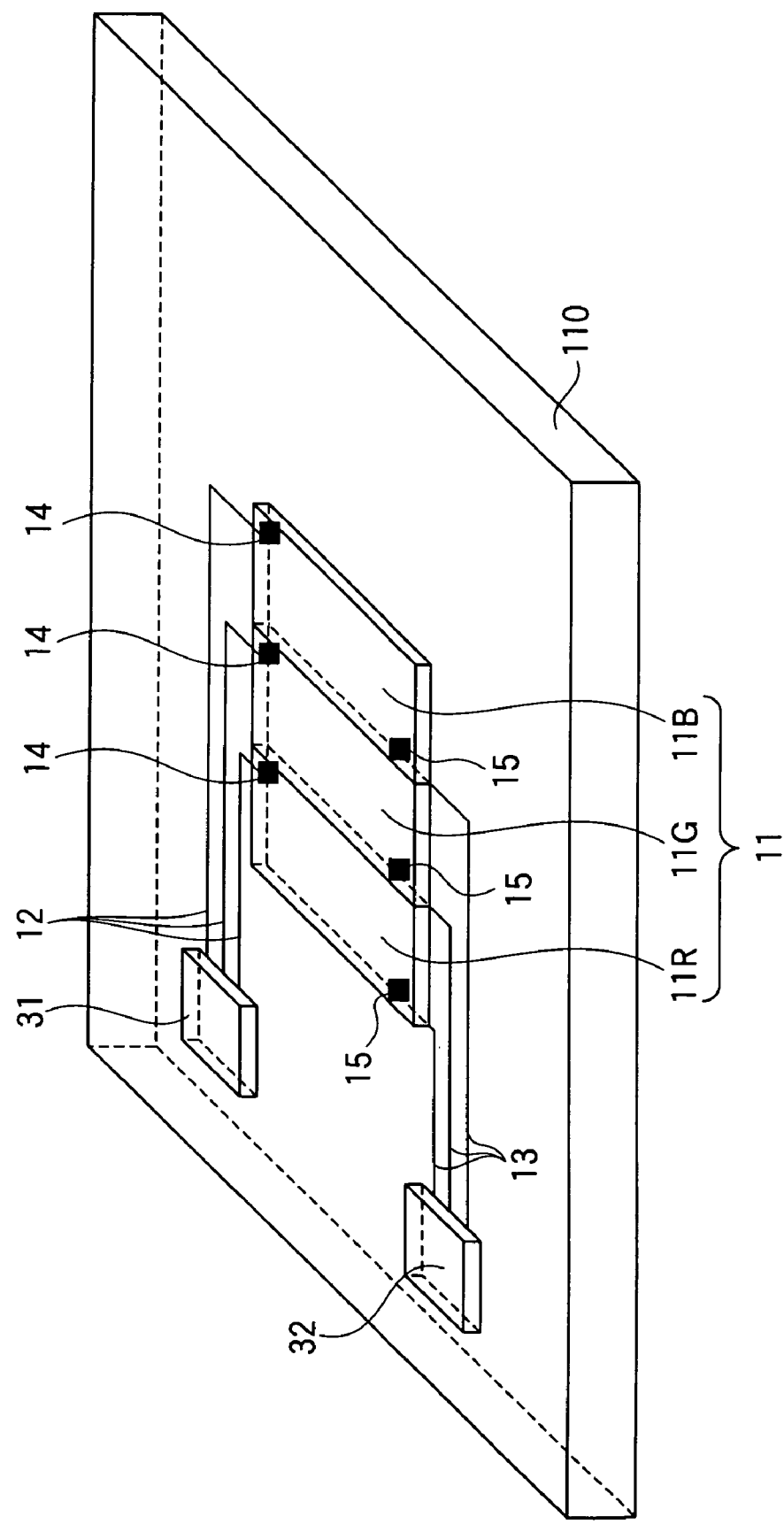
FIG. 17 is a perspective view showing an arrangement of LEDs according to the fifth embodiment of the present invention.
Figure 18:
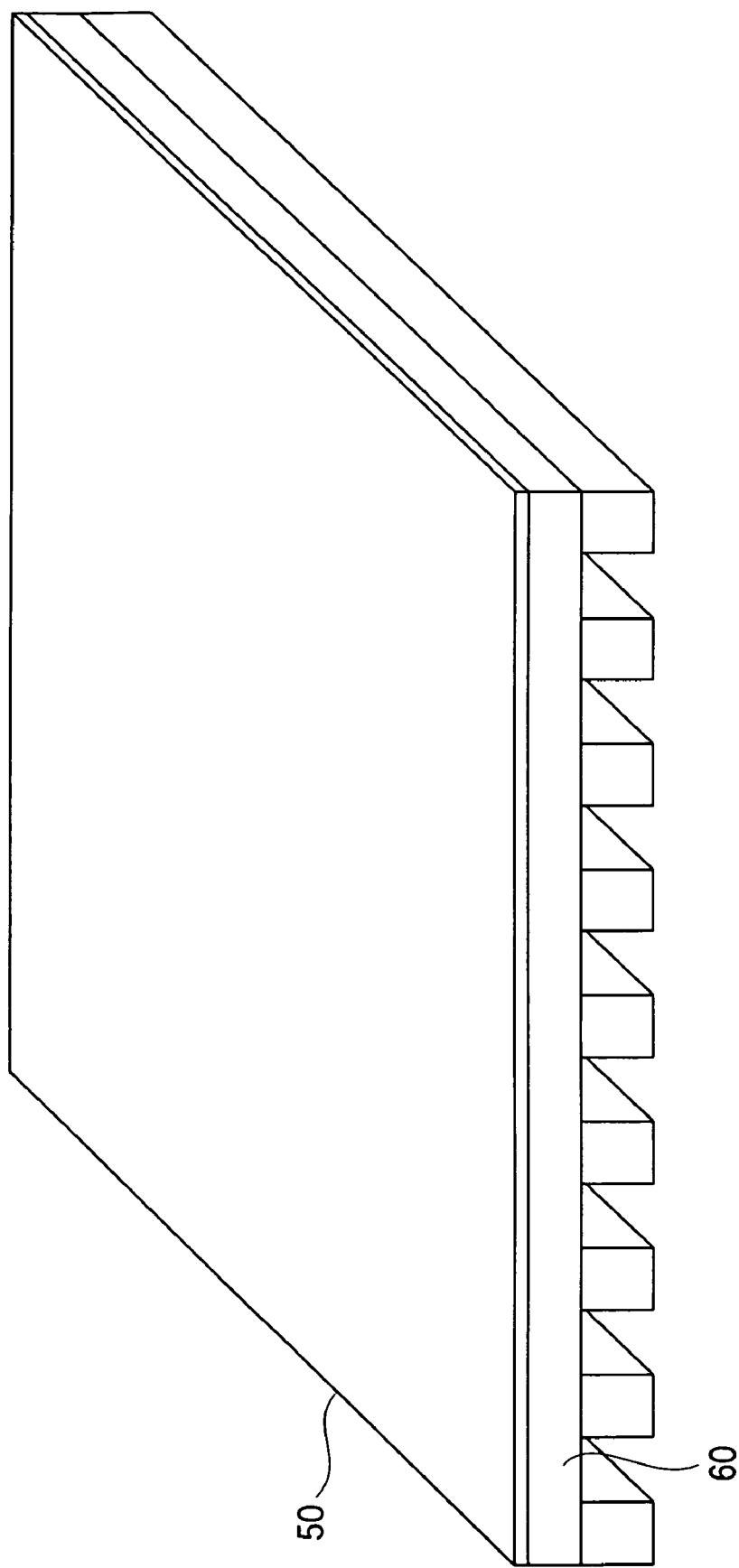
FIG. 18 is a perspective view showing a heat releasing plate according to the fifth embodiment of the present invention.
Figure 19:
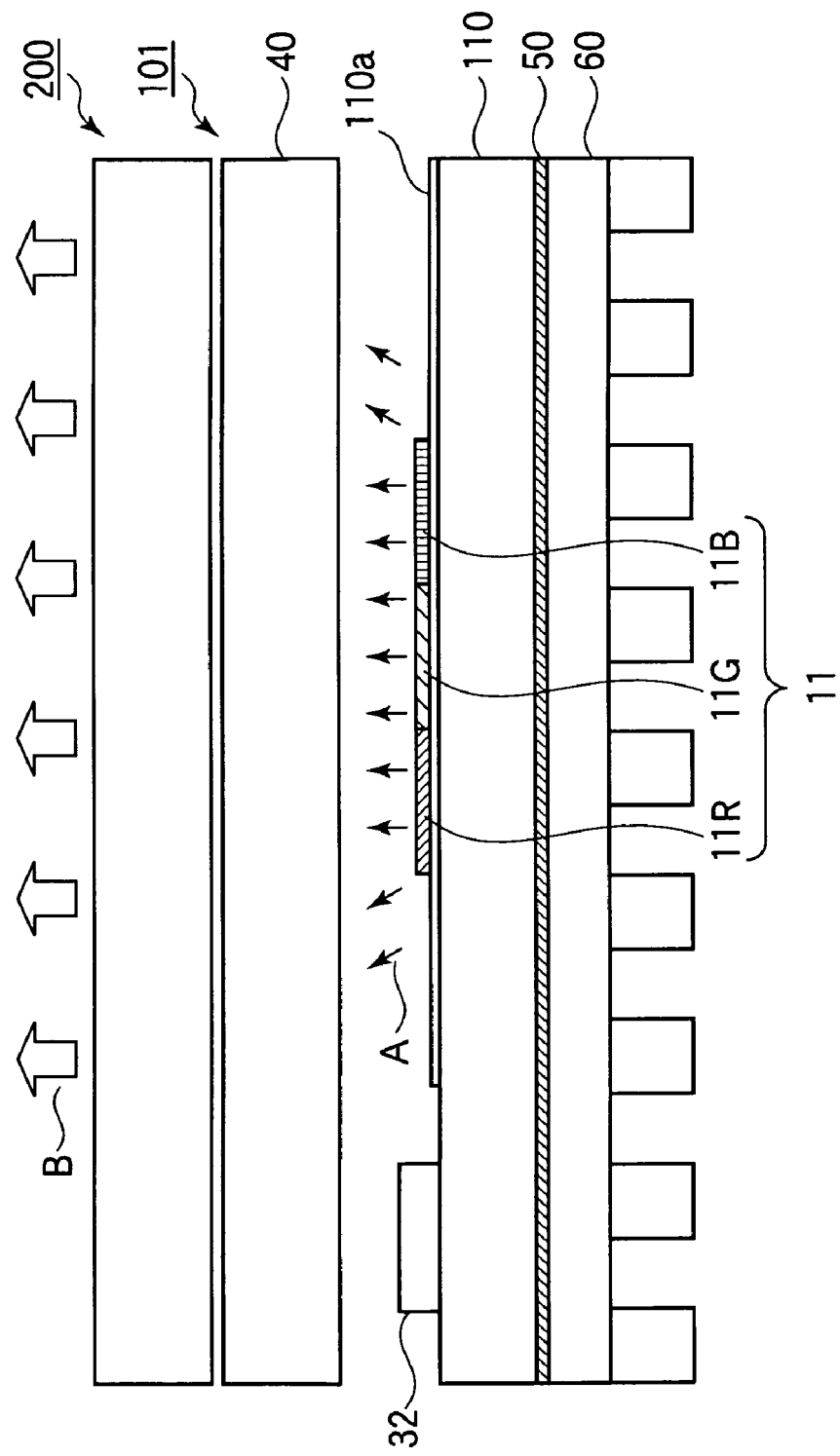
FIG. 19 is a side sectional view showing an LCD device including the LED backlight device according to the fifth embodiment of the present invention.

FIG. 16 is a side sectional view showing an LED backlight device according to the fifth embodiment of the present invention. FIG. 17 is a perspective view showing an arrangement of LEDs according to the fifth embodiment of the present invention. FIG. 18 is a perspective view showing a heat releasing plate according to the fifth embodiment of the present invention. FIG. 19 is a side sectional view showing an LCD device using the LED backlight device according to the fifth embodiment of the present invention.

As shown in FIG. 19, an LED backlight device 101 according to the fifth embodiment and the LCD panel 200 constitute an LCD device. The LED backlight device 101 is disposed on a backside of the LCD panel 200 (i.e., a side of the LCD panel 200 opposite to a display surface), and functions as a light source for illuminating the LCD panel 200.

As shown in FIG. 16, the LED backlight device 101 includes a substrate 110 (i.e., a first substrate) in the form of a flat plate. The substrate 110 has a first surface (i.e., an upper surface in FIG. 16) and a second surface (i.e., a lower surface in FIG. 16) opposite to the first surface. The LED backlight device 101 further includes LEDs 11 (i.e., LED thin-film) fixed to the first surface of the substrate 110. The LEDs 11 include the LED 11R that emits red light, the LED 11G that emits green light, and the LED 11B that emits blue light, as was described in the first embodiment. The LEDs 11R, 11G and 11B are collectively referred to as LEDs 11.

As shown in FIG. 17, the anode driver IC 31 and the cathode driver IC 32 for driving the LEDs 11 are disposed on the first surface of the substrate 110. The anode wirings 12 are formed on the first surface of the substrate 110, and the ends of the anode wirings 12 are connected to the anode driver IC 31. The anode wirings 12 are connected to respective anode electrodes 14 formed on the LEDs 11. The cathode wirings 13 are formed on the first surface of the substrate 110, and the ends of the cathode wirings 13 are connected to the cathode driver IC 32. The cathode wirings 13 are connected to respective cathode electrodes 15 formed on the LEDs 11.

The heat releasing plate 60 is bonded to the second surface (i.e., the lower surface in FIG. 16) of the substrate 110 by means of the thermally-conductive adhesive agent 50. In other words, the heat releasing plate 60 is fixed to a surface of the substrate 110 opposite to the surface to which the LEDS 11 are fixed. The heat releasing plate 60 is made of metal or the like having excellent thermal conductivity.

The substrate 110 is preferably composed of a metal substrate, a silicon substrate or a ceramic substrate having excellent thermal conductivity, or a heat-resistant glass-epoxy laminate (FR4) designed for thermal conductivity. The substrate 110 has a surface layer (denoted by a numeral 110a in FIG. 16) composed of an organic insulation film (such as polyimide film) or an inorganic insulation film. The surface layer 110a is planarized so that the surface accuracy is several tens of nanometers or less. The LED 11R that emits red light, the LED 11G that emits green light, and the LED 11B that emits blue light are composed of layered thin-films. The LEDs 11R, 11G and 11B are peeled off from another substrate as described later, and are fixed to the substrate 110 by means of intermolecular force such as hydrogen bonding so as to be integrated with the substrate 110.

The LED 11R is composed of a layered thin-film having heterostructure or double heterostructure formed by epitaxially growing inorganic material such as aluminum gallium arsenide, aluminum gallium indium arsenide or the like. The LED 11R is not limited to these materials, but can be composed of any kind of material that emits light having the wavelength in a range from 620 nm to 710 nm. The LED 11G is composed of a layered thin-film having heterostructure or double heterostructure formed by epitaxially growing inorganic material such as aluminum gallium indium phosphide, gallium phosphide or the like. The LED 11G is not limited to these materials, but can be composed of any kind of material that emits light having the wavelength in a range from 500 nm to 580 nm. The LED 11B is composed of a layered thin-film having heterostructure or double heterostructure formed by epitaxially growing inorganic material such as gallium nitride, gallium indium nitride or the like. The LED 11B is not limited to these materials, but can be composed of any kind of material that emits light having the wavelength in a range from 450 nm to 500 nm.

The anode electrodes 14 and the cathode electrodes 15 are metal electrodes composed of gold, aluminum, or layered metal electrodes composed of gold or aluminum layered with nickel, titan or the like. The anode electrodes 14 and the cathode electrodes 15 are respectively connected to anodes and cathodes of the LEDs 11.

The anode wirings 12 and the cathode wirings 13 are metal wirings composed of gold, aluminum, or layered metal wirings composed of gold or aluminum layered with nickel, titan or the like. The anode wirings 12 and the cathode wirings 13 are respectively connected to the anode electrodes 14 and the cathode electrodes 15 of the LEDs 11. The ends of the anode wirings 12 are connected to the anode driver IC 31, and the ends of the cathode wirings 13 are connected to the cathode driver IC 32, so that the anode electrodes 14 and the cathode electrodes 15 of the LEDs 11 are connected to the anode driver IC 31 and the cathode driver IC 32 via the anode wirings 12 and the cathode wirings 13.

As shown in FIG. 16, the LED backlight device 101 further includes the light diffusion plate 40 (i.e., a second substrate) in the form of a flat plate. The light diffusion plate 40 is formed of a plastic substrate having optical transparency. The light diffusion plate 40 has a function to uniformly diffuse incident light, and is composed of polymer material such as polycarbonate or polyethylene terephthalate.

As shown in FIG. 16, the substrate 110 and the light diffusion plate 40 are disposed facing each other, so that the LED backlight device 101 is constituted. The first surface of the substrate 110 (to which the LEDs 11 are fixed) and the light diffusion plate 40 are positioned so as to face each other. The heat releasing plate 60 is made of metal such as aluminum, and the thermally-conductive adhesive agent 50 composed of silicone resin or the like is coated on the surface of the heat releasing plate 60. The heat releasing plate 60 is bonded to the second surface (opposite to the first surface) of the substrate 110 by means of the adhesive agent 50.

The anode driver IC 31 has a function to supply electric current to the LEDs 11 according to a lighting signal. The anode driver IC 31 includes circuits such as a constant current circuit or an amplifier circuit. The anode wirings 12 are connected to the anode electrodes 14 of the LEDs 11 and are also connected to driving elements of the anode driver IC 31. Although the anode driver IC 31 is provided on the substrate 110 in the example shown in FIG. 17, the anode driver IC 31 is not necessarily provided on the substrate 110, but can be provided on other print circuit board (not shown) or the like.

The cathode driver IC 32 has a function to allow the electric current to flow therein. The cathode driver IC 32 includes switching circuits such as a transistor. The cathode wirings 13 are connected to the cathode electrodes 15 of the LEDs 11 and are also connected to the cathode driver IC 32. Although the cathode driver IC 32 is provided on the substrate 110 in the example shown in FIG. 17, the cathode driver IC 32 is not necessarily provided on the substrate 110, but can be provided on other print circuit board (not shown) or the like.

Next, a process for providing the LED 11 on the substrate 110 according to the fifth embodiment will be described.

Figure 20:
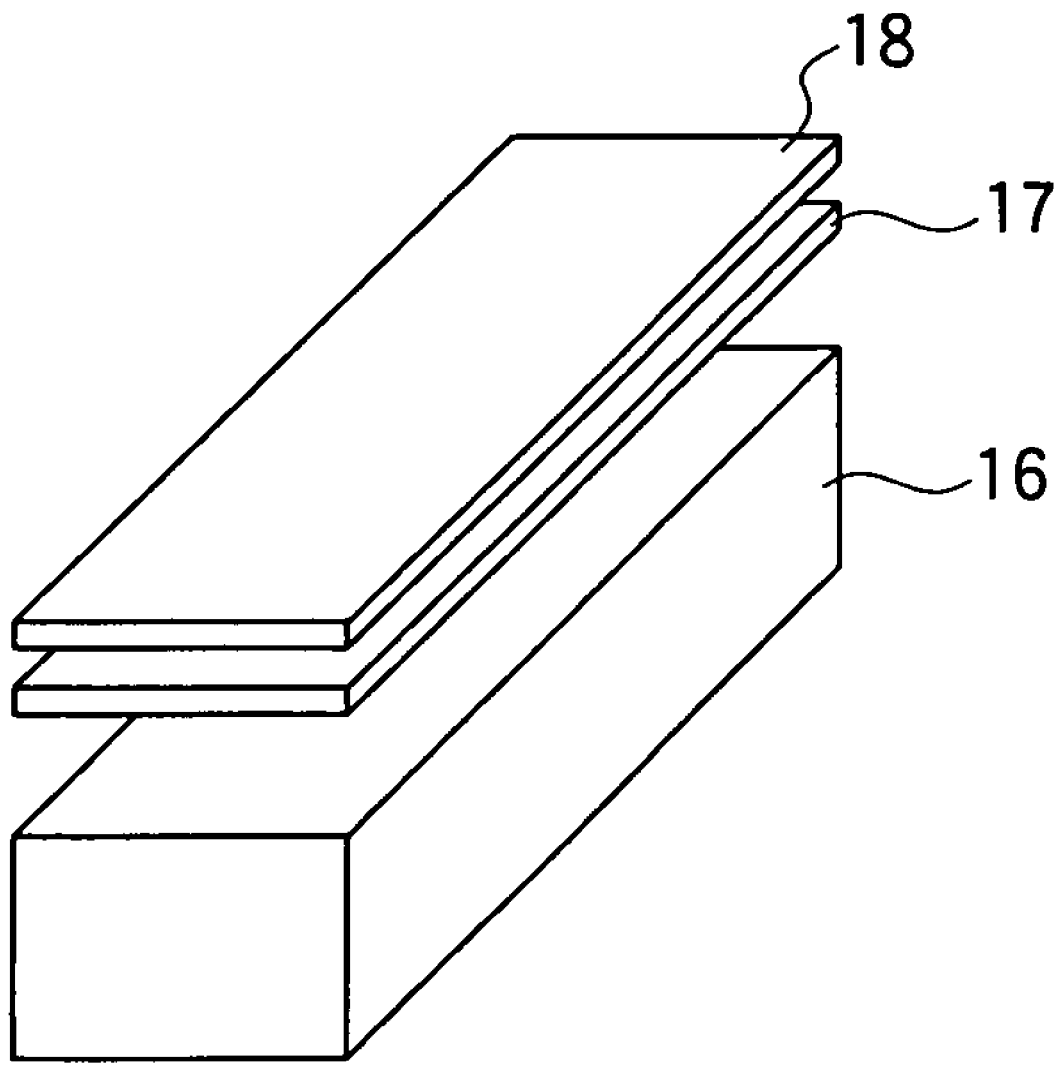
FIG. 20 is a schematic view showing a process for peeling an LED thin-film according to the fifth embodiment of the present invention.
Figure 21:
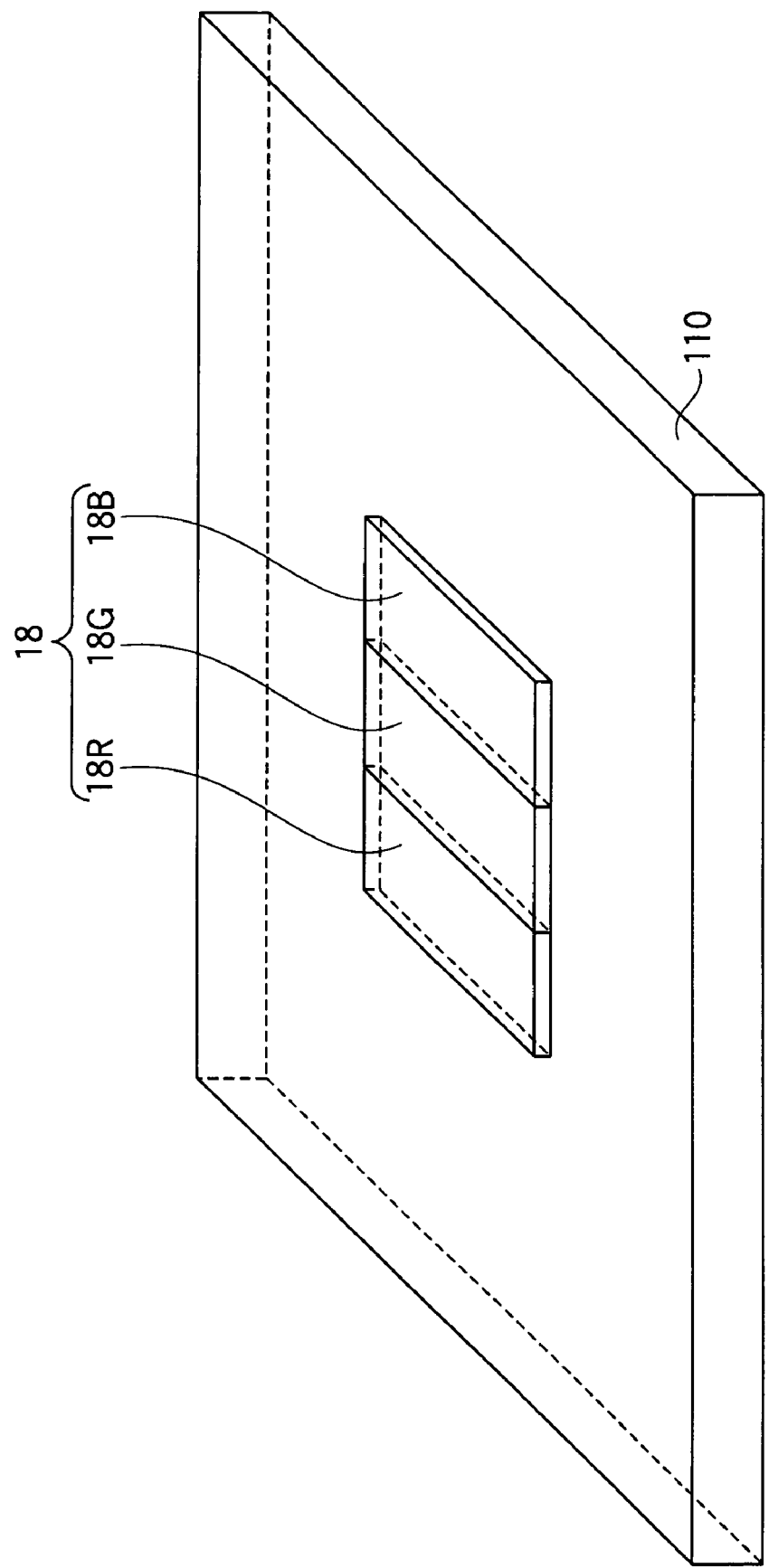
FIG. 21 is a schematic view showing a process for fixing the LED thin-film to a substrate according to the fifth embodiment of the present invention.

FIG. 20 shows a process for peeling an LED thin-film 18 (for forming the LED 11) according to the fifth embodiment of the present invention. FIG. 21 shows a process for fixing the LED thin-film to the substrate 110 according to the fifth embodiment of the present invention.

As shown in FIG. 20, the LED thin-film 18 for forming the LED 11 is in the form of an elongated band or a strip. For example, the LED thin-film 18R for forming the LED 11R (that emits red light) has a layered structure of heterostructure or double-heterostructure composed of a plurality of layers such as aluminum gallium arsenide, aluminum gallium indium arsenide.

The sacrificial layer 17 is provided between the base material 16 and the LED thin-film 18 for peeling (i.e., separating) the LED thin-film 18 from the base material 16. The sacrificial layer 17 is composed of material such as, for example, aluminum arsenide that can easily be etched by an etching solution described later.

The base material 16 is composed of, for example, gallium arsenide, gallium nitride, sapphire or the like. Inorganic material layers forming the LED thin-film 18 are epitaxially grown on the base material 16 using a vapor-phase growth method such as an MOCVD method.

Next, a process for peeling the LED thin-film 18 from the base material 16 will be described.

If the combination of the LEDs 11R, 11G and 11B forms, for example, a square having each side of 20 mm in length, the LED thin-film 18 is formed into a strip shape having a length longer than 20 mm and a width wider than ⅓ of 20 mm. In this case, the LED thin-film 18 is formed into a strip shape using an etching solution such as a solution containing phosphoric acid, hydrogen peroxide and water ($H_3PO_4:H_2O_2:H_2O$) or the like, by means of a photolithographic etching technique broadly used in a semiconductor manufacturing process.

Then, the base material 16 on which the LED thin-film 18 is formed is immersed in an etching solution such as hydrogen fluoride solution, hydrochloric acid solution or the like. With this, the sacrificial surface 17 is etched (removed), and the LED thin-film 18 is peeled off from the base material 16.

Next, the LED thin-film 18 (having been peeled off from the base material 16) is pressed against the planarized surface of the substrate 110, so that the LED thin-film 18 and the substrate 110 are fixed to each other by means of intermolecular force and integrated with each other.

The surface layer 110a (FIG. 16) of the substrate 110 is composed of an organic insulation film such as a polyimide film or an inorganic insulation film such as a silicon oxide film, and preferably has a flat surface whose surface accuracy is less than or equal to several tens of nanometers having no concaves or convexes. Since the surface of the substrate 110 is such a flat surface having no concave or convex, the bonding between the LED thin-film 18 and the substrate 110 by means of intermolecular force (such as hydrogen bonding or the like) can be easily achieved.

These processes are repeated, so that a plurality of columns (for example, three columns) of the LED thin-films 18R, 18G and 18B are fixed to the substrate 110 as shown in FIG. 21, and the LED thin-films 18R, 18G and 18B are integrated with the substrate 110.

Subsequently, connecting portions for the anode electrodes 14 and the cathode electrodes 15 are formed on the LED thin-films 18 (having been fixed to the substrate 110) using, for example, a photolithographic etching method using an etching solution containing phosphoric acid, hydrogen peroxide and water ($H_3PO_4:H_2O_2:H_2O$). Then, the anode electrodes 14, the cathode electrodes 15, the anode wirings 12 (connected to the anode electrodes 14) and the cathode wirings 13 (connected to the cathode electrodes 15) are formed using a deposition, a photolithographic etching method or a lift-off method. Furthermore, the anode driver IC 31 and the cathode driver IC 32 are mounted on the substrate 110, and the anode wirings 12 and the cathode wirings 13 are respectively connected to the anode driver IC 31 and the cathode driver IC 32.

In the above description, each LED thin-film 18 has a strip shape so as to form the LEDs 11R, 11G and 11B whose combination forms a square having each side of 20 mm in length. However, the length of the combination of the LEDs 11R, 11G and 11B is not limited to 20 mm, and the LEDs 11R, 11G and 11B can be of any shape such as an elongated rectangle, a circle or an ellipse. Further, in the above description, the LED thin-films 18 for forming the LEDs 11R, 11G and 11B have the same dimensions. However, the LED thin-films 18 for forming the LEDs 11R, 11G and 11B can have different dimensions according to coloration or weighing of respective colors. Further, the LED thin-film 18 can be of any shape such as a triangle, a square, a polygon, a circle or an ellipse.

Furthermore, in the above description, the LEDs 11R, 11G and 11B are provided one for each color. However, it is possible to provide two or more LEDs 11R, 11G and 11B for each color according to a required light intensity or a size of the LED backlight device 101. Further, the number of anode wirings 12 and the cathode wirings 13 can be increased according to the number of the LEDs 11R, 11G and 11B.

Next, the operation of the LED backlight device 101 of the fifth embodiment will be described.

A lighting signal is sent from a superior device (such as a not shown personal computer) and is inputted to the anode driver IC 31. Upon receiving the lighting signal, the amplifier circuit of the anode driver IC 31 applies stable currents of different current values to the anode electrodes 14 of the LEDs 11R, 11G and 11B via the anode wirings 12. In this regard, the current values are determined so that the mixture of the lights emitted by the LEDs 11R, 11G and 11B forms white light. When the lighting signal is inputted to the cathode driver IC 32, the cathode driver IC 32 allows the currents to flow therein from the cathode electrodes 15 of the LEDs 11R, 11G and 11B through the cathode wirings 13 via the switching circuit, so that the LEDs 11R, 11G and 11B emit lights. The lights emitted by the LEDs 11R, 11G and 11B are incident on the light diffusion plate 40 as shown by arrows A in FIG. 16. The lights of the respective colors are uniformly diffused in the light diffusion plate 40, and white light is emitted by the light diffusion plate 40 as shown by arrows B in FIG. 16. The LCD panel 200 (FIG. 19) facing the LED backlight device 101 is illuminated by the white light emitted by the light diffusion plate 40.

In this case, the heat generated by the emission of the LEDs 11R, 11G and 11B is diffused from the second surface (opposite to the first surface to which the LEDs 11 are fixed) of the substrate 110 via the thermally-conductive adhesive agent 50 and the heat releasing plate 60, and therefore the temperatures of the substrate 110 and the light diffusion plate 40 do not substantially increase.

As described above, according to the fifth embodiment, the heat releasing plate 60 is bonded to the second surface of the substrate 110 using the thermally-conductive adhesive agent 50. Further, the LEDs 11, the anode wirings 12 and the cathode wirings 13 are formed using the semiconductor process, and the LEDs 11 are connected to the anode wirings 12 and the cathode wirings 13 using the semiconductor process. Therefore, a thin LED backlight device having excellent heat releasing property can be obtained.

Sixth Embodiment

Next, the sixth embodiment of the present invention will be described. Components of the sixth embodiment that are the same as those of the fifth embodiment are assigned the same reference numerals, and descriptions thereof are omitted. Further, descriptions of the operations and advantages that are same as those of the fifth embodiment are omitted.

Figure 22:
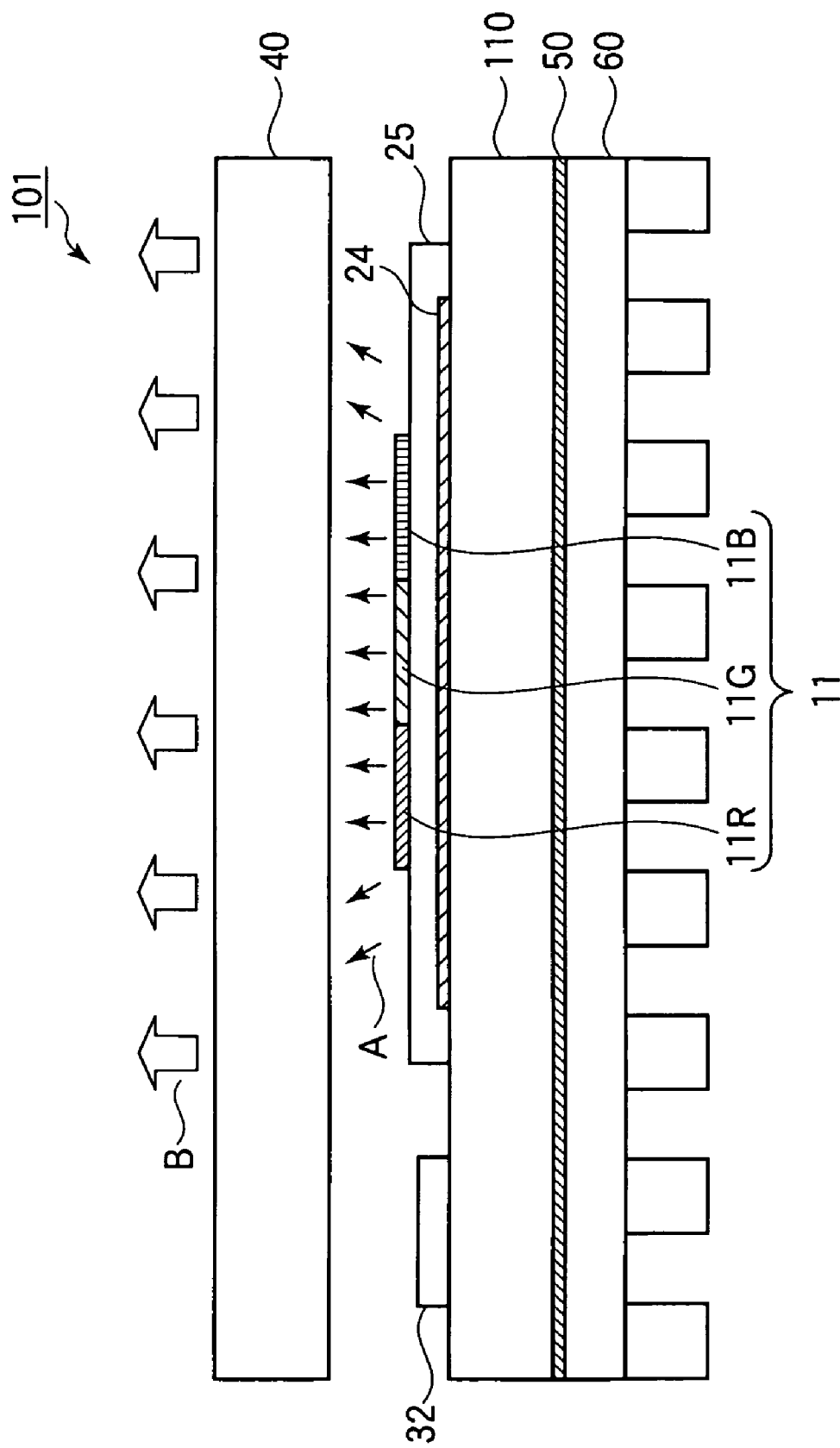
FIG. 22 is a side sectional view showing an LED backlight device according to the sixth embodiment of the present invention.

FIG. 22 is a side sectional view showing the LED backlight device according to the sixth embodiment of the present invention.

In the sixth embodiment, the LED backlight device 101 has the reflection film 24 that reflects light emitted by the LEDs 11. To be more specific, the reflection film 24 is formed on the first surface (i.e., the upper surface in FIG. 22) of the substrate 110. The protection film 25 is formed on the first surface of the substrate 110 to entirely cover the reflection film 24. The LEDs 11, the anode electrodes 14, the cathode electrodes 15, the anode wirings 12 and the cathode wirings 13 (see FIG. 17) are provided on the surface of the protection film 25. The anode driver IC 31 and the cathode driver IC 32 are provided on the first surface of the substrate 110 out of the protection film 25. In this regard, the anode electrodes 14, the cathode electrodes 15, the anode wirings 12, the cathode wirings 13 and the cathode driver IC 32 are omitted in FIG. 22.

The reflection film 24 is provided for reflecting lights of respective colors emitted from the back surfaces (i.e., lower surfaces in FIG. 22) of the LEDs 11. The reflection film 24 is formed by forming a metal film composed of gold or aluminum, or a layered metal film composed of gold or aluminum layered with nickel, titan or the like on the surface of the substrate 110, and patterning the metal film.

The protection film 25 is composed of an organic insulation film (such as a polyimide film) or an inorganic insulation film (such as a silicon oxide film), and is formed on the reflection film 24. The surface of the protection film 25 is planarized to form a flat surface whose surface accuracy is less than or equal to several tens of nanometers having no concaves or convexes. Since the surface of the protection film 25 is such a flat surface having no concave or convex, the bonding between the LEDs 11 and the substrate 110 by means of intermolecular force (such as hydrogen bonding or the like) can be easily achieved.

As was described in the fifth embodiment, the LED thin-films 18 (see FIG. 20) are separated from the base material 16 and are pressing against the surface of the protection film 25, so that the LEDs 11 are fixed to (and integrated with) the protection film 25 by means of intermolecular force.

Subsequently, connecting portions for the anode electrodes 14 and the cathode electrodes 15 are formed on the LED thin-films 18 (having been fixed to the protection film 25) using, for example, a photolithographic etching method using an etching solution containing phosphoric acid, hydrogen peroxide and water ($H_3PO_4$:$H_2O_2$:$H_2O$). Then, the anode electrodes 14, the cathode electrodes 15, the anode wirings 12 (connected to the anode electrodes 14) and the cathode wirings 13 (connected to the cathode electrodes 15) are formed using a deposition, a photolithographic etching method or a lift-off method. Furthermore, the anode driver IC 31 and the cathode driver IC 32 are mounted on the substrate 110, and the anode wirings 12 and the cathode wirings 13 are respectively connected to the anode driver IC 31 and the cathode driver IC 32.

Further, as was described in the fifth embodiment, the heat releasing plate 60 made of metal such as aluminum (on which the thermally-conductive adhesive agent 50 composed of silicone resin or the like is coated) is bonded to the second surface (opposite to the LEDs 11) of the substrate 110 by means of the adhesive agent 50.

Other components of the LED backlight device 101 of the sixth embodiment are the same as those of the fifth embodiment, and descriptions thereof are omitted.

Next, the operation of the LED backlight device 101 according to the sixth embodiment will be described.

A lighting signal is sent from a superior device (such as a not shown personal computer) and is inputted to the anode driver IC 31. Upon receiving the lighting signal, the amplifier circuit of the anode driver IC 31 applies stable currents of different current values to the anode electrodes 14 of the LEDs 11R, 11G and 11B via the anode wirings 12. In this regard, the current values are determined so that the mixture of the lights emitted by the LEDs 11R, 11G and 11B forms white light. When the lighting signal is inputted to the cathode driver IC 32, the cathode driver IC 32 allows the currents to flow therein from the cathode electrodes 15 of the LEDs 11R, 11G and 11B through the cathode wirings 13 via the switching circuit, so that the LEDs 11R, 11G and 11B emit lights. The lights emitted from the back surfaces (i.e., the lower surfaces in FIG. 22) of the LEDs 11R, 11G and 11B are reflected by the reflection film 24, and are incident on the light diffusion plate 40 as well as the lights emitted from the main surfaces (i.e., the upper surfaces in FIG. 22) of the LEDs 11R, 11G and 11B as shown by arrows A in FIG. 22. The lights of the respective colors are uniformly diffused in the light diffusion plate 40, and white light is emitted by the light diffusion plate 40 as shown by arrows B in FIG. 22.

In this case, the heat generated by the emission of the LEDs 11R, 11G and 11B is diffused from the second surface (opposite to the LEDs 11) of the substrate 110 via the thermally-conductive adhesive agent 50 and the heat releasing plate 60, and therefore the temperatures of the substrate 110 and the light diffusion plate 40 do not substantially increase.

As described above, according to the sixth embodiment, the reflection film 24 is provided facing the back surfaces of the LEDs 11. Further, the LEDs 11, the anode wirings 12 and the cathode wirings 13 are formed using the semiconductor process, and the LEDs 11 are connected to the anode wirings 12 and the cathode wirings 13 using the semiconductor process. Accordingly, a thin LED backlight device having higher light intensity compared with the fifth embodiment can be obtained.

Seventh Embodiment

Next, the seventh embodiment of the present invention will be described. Components of the seventh embodiment that are the same as those of the fifth or sixth embodiment are assigned the same reference numerals, and descriptions thereof are omitted. Further, descriptions of the operations and advantages that are same as those of the fifth or sixth embodiment are omitted.

Figure 23:
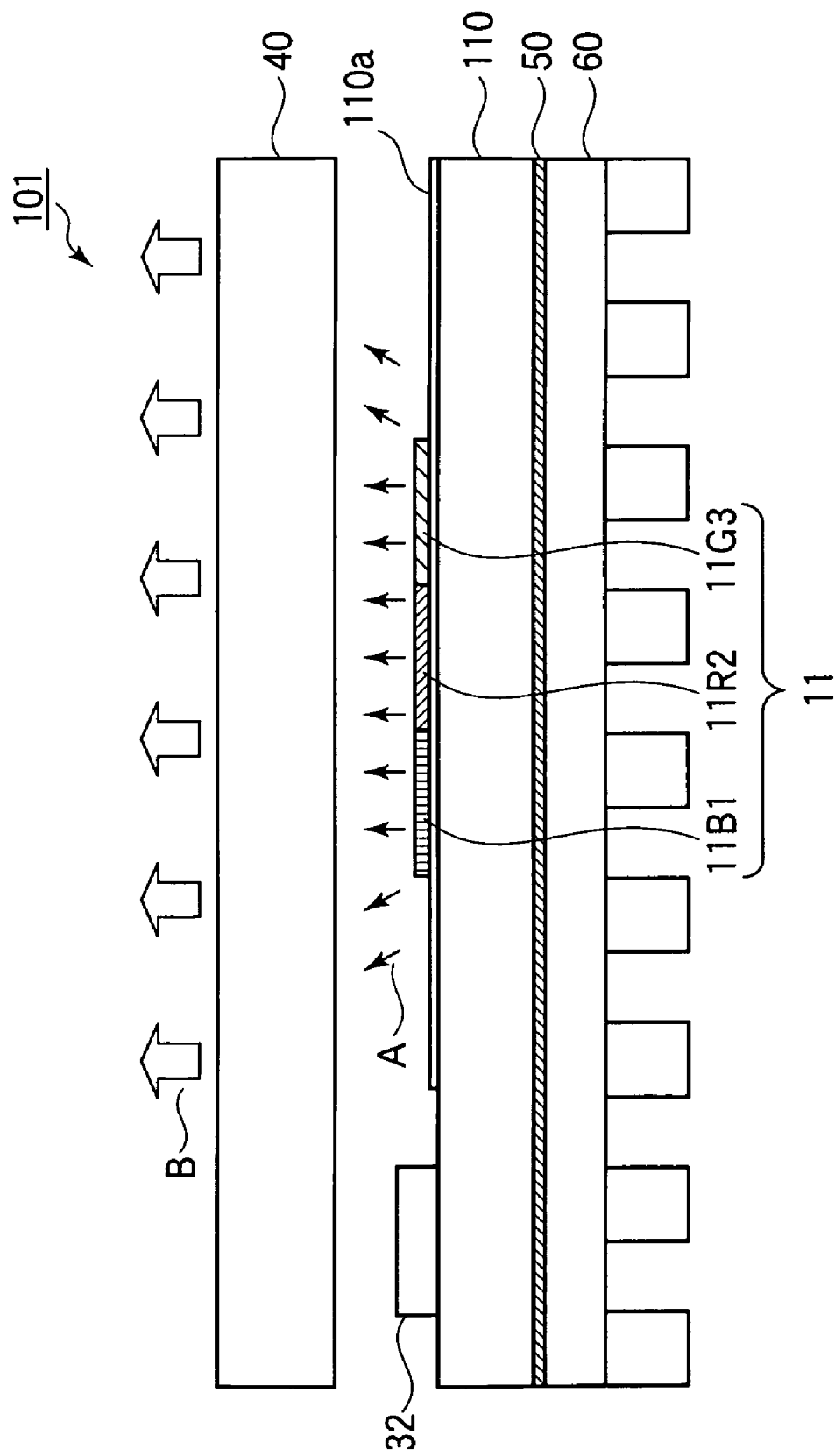
FIG. 23 is a side sectional view showing an LED backlight device according to the seventh embodiment of the present invention.
Figure 24:
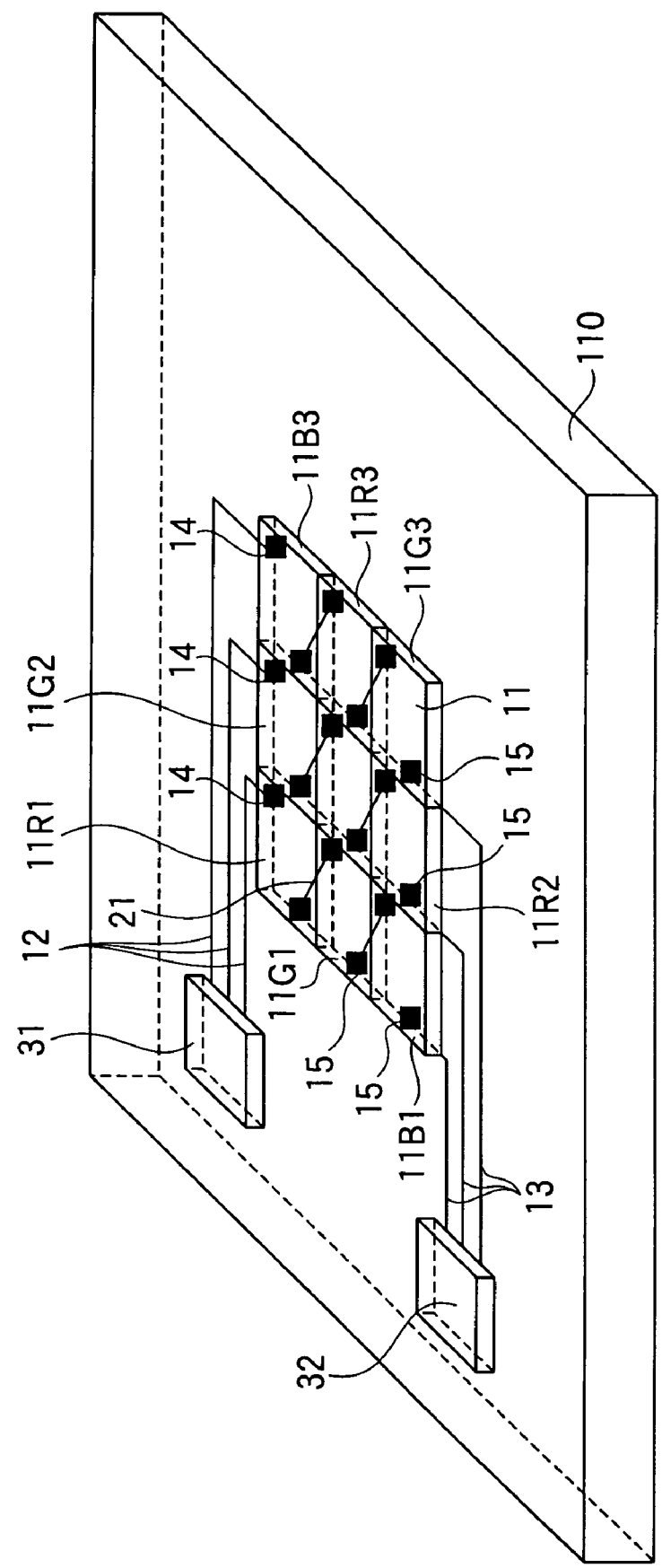
FIG. 24 is a perspective view showing an arrangement of LEDs according to the seventh embodiment of the present invention.
Figure 25:
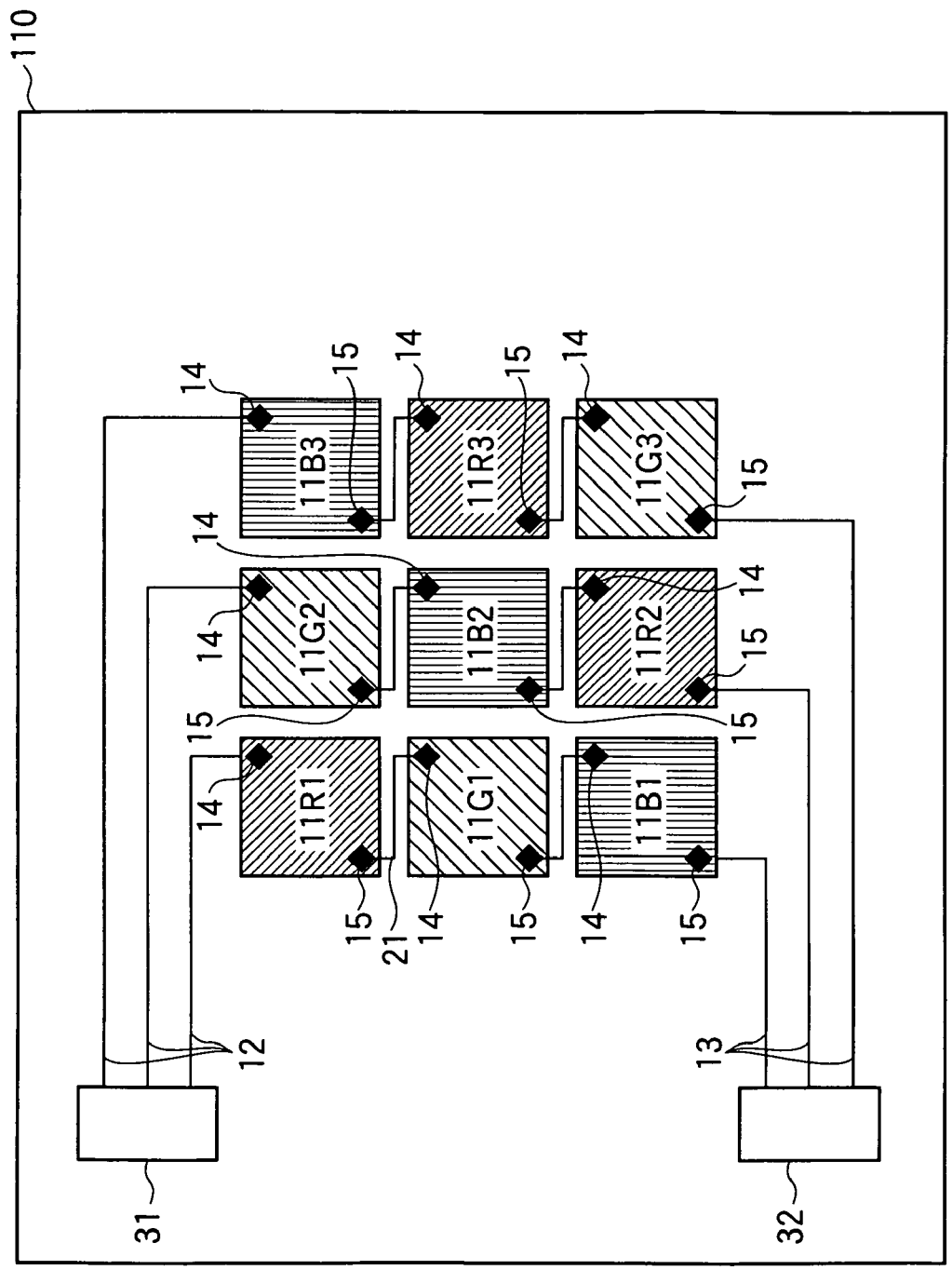
FIG. 25 is a plan view showing the arrangement of the LEDs according to the seventh embodiment of the present invention.
Figure 26:
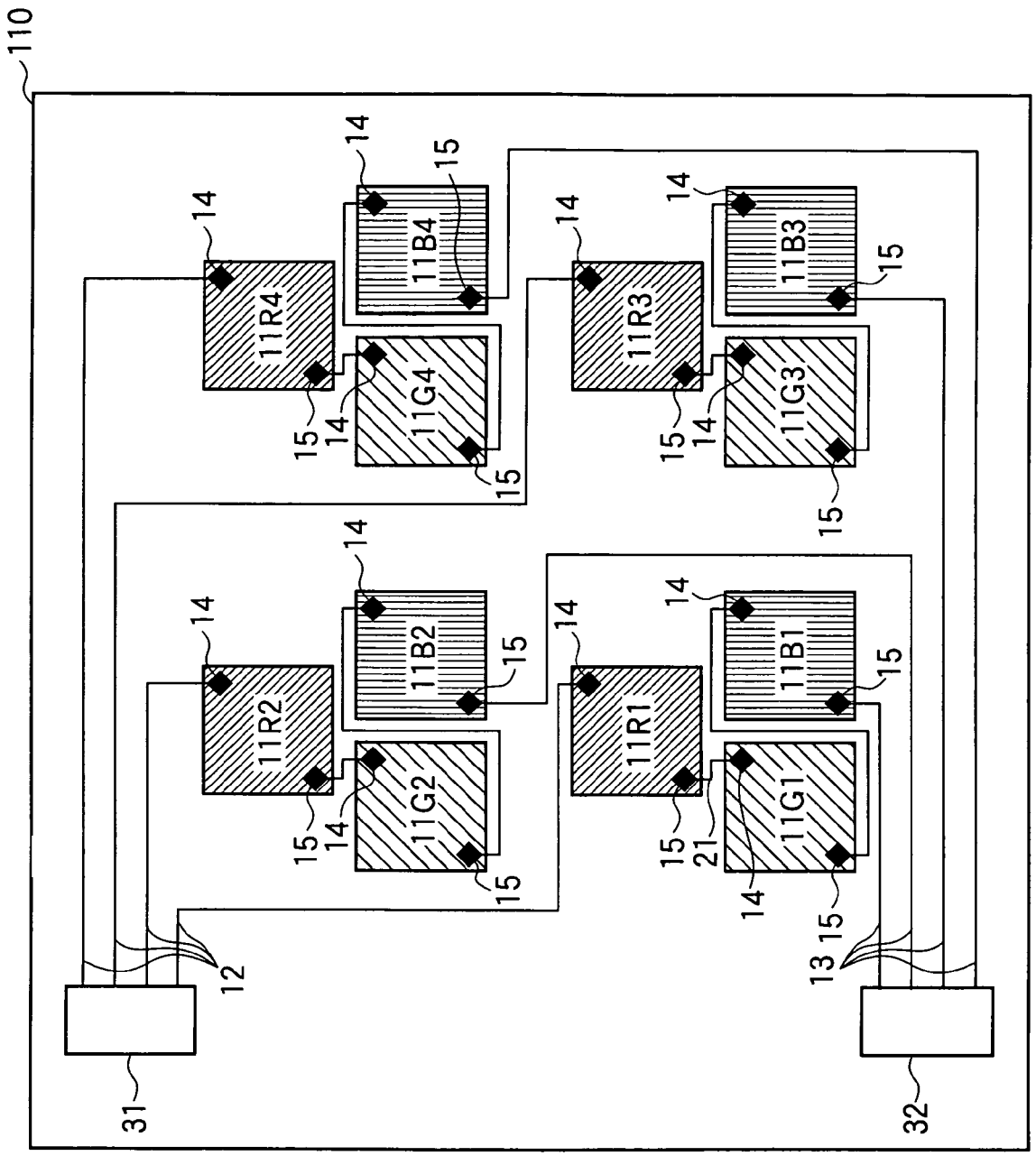
FIG. 26 is a plan view showing another example of the arrangement of the LEDs according to the seventh embodiment of the present invention.

FIG. 23 is a side sectional view showing the LED backlight device according to the seventh embodiment of the present invention. FIG. 24 is a perspective view showing an arrangement of LEDs according to the seventh embodiment of the present invention. FIG. 25 is a plan view showing the arrangement of the LEDs according to the seventh embodiment of the present invention. FIG. 26 is a plan view showing another example of the arrangement of the LEDs according to the seventh embodiment of the present invention.

In the seventh embodiment, the LED backlight device 101 includes the substrate 110 (i.e., the first substrate) in the form of a flat plate and the LEDs 11 (i.e., the layered thin-films) fixed to the substrate 110. As shown in FIG. 25, the LEDs 11 include LEDs 11R1, 11R2 and 11R3 that emit red light, LEDs 11G1, 11G2 and 11G3 that emit green light and LEDs 11B1, 11B2 and 11B3 that emit blue light. The LEDs 11R1, 11R2, 11R3, 11G1, 11G2, 11G3, 11B1, 11B2 and 11B3 are collectively referred to as the LEDs 11. The LEDs 11R1, 11R2 and 11R3 are collectively referred to as the LEDs 11R. The LEDs 11G1, 11G2 and 11G3 are collectively referred to as the LEDs 11G. The LEDs 11B1, 11B2 and 11B3 are collectively referred to as the LEDs 11B.

The number of LEDs 11 can be arbitrarily determined. In this example, the number of LEDs 11 is set to 9 for convenience of graphic illustration. An arranging manner of the LEDs 11 can be arbitrarily determined. In this example, the LEDs 11 are arranged in a grid. To be more specific, the LEDs 11 are arranged in a square grid of 3 rows and 3 columns at constant intervals as shown in FIGS. 24 and 25.

Each column (i.e., group) includes three LEDs 11R, 11G and 11B one for each color which are electrically connected in series. To be more specific, the first column (i.e., the left column in FIG. 25) includes LEDs 11R1, 11G1 and 11B1 electrically connected in series. The second column (i.e., the center column in FIG. 25) includes LEDs 11G2, 11B2 and 11R2 electrically connected in series. The third column (i.e., the right row in FIG. 25) includes LEDs 11B3, 11R3 and 11G3 electrically connected in series. The anode wirings 12 (whose ends are connected to the anode driver IC 31) are connected to the anode electrodes 14 of endmost LEDs 11 (i.e., the LEDs 11R1, 11G2 and 11B3) closest to the anode driver IC 31 in the respective columns. The cathode wirings 13 (whose ends are connected to the cathode driver IC 32) are connected to the cathode electrodes 15 of opposite endmost LEDs 11 (i.e., the LEDs 11B1, 11R2 and 11G3) farthest from the anode driver IC 31 in the respective columns. In each column, the anode electrode 14 and the cathode electrode 15 of the adjacent LEDs 11 are connected by interconnection wirings 21. In other words, the LEDs 11 of each column are electrically connected in series via the interconnection wirings 21, and the anode electrode 14 and the cathode electrode 15 of the endmost LEDs 11 of each column are connected to the anode driver IC 31 and the cathode driver IC 32 via the anode wirings 12 and the cathode wirings 13.

As shown in FIG. 23, the LED backlight device 101 further includes the heat releasing plate 60 fixed to the second surface (opposite to the first surface to which the LEDs 11 are fixed) of the substrate 110 via the thermally-conductive adhesive agent 50. The heat releasing plate 60 is composed of metal or the like having excellent thermal conductivity.

The substrate 110 is preferably composed of a metal substrate, a silicon substrate or a ceramic substrate having excellent thermal conductivity, or a heat-resistant glass-epoxy laminate (FR4) designed for thermal conductivity. The substrate 110 has a surface layer (denoted by a numeral 110a in FIG. 23) composed of an organic insulation film (such as polyimide film) or an inorganic insulation film. The surface layer 110a is planarized so that the surface accuracy is several tens of nanometers or less. The LEDs 11R that emit red light, the LEDs 11G that emit green light, and the LEDs 11B that emit blue light are composed of layered thin-films. The LEDs 11R, 11G and 11B are peeled off from another substrate as described later, and are fixed to the substrate 110 by means of intermolecular force such as hydrogen bonding so as to be integrated with the substrate 110.

The LEDs 11R are composed of layered thin-films having heterostructure or double heterostructure formed by epitaxially growing inorganic material such as aluminum gallium arsenide, aluminum gallium indium arsenide or the like. The LEDs 11R are not limited to these materials, but can be composed of any kind of material that emits light having the wavelength in a range from 620 nm to 710 nm. The LEDs 11G are composed of layered thin-films having heterostructure or double heterostructure formed by epitaxially growing inorganic material such as aluminum gallium indium phosphide, gallium phosphide or the like. The LEDs 11G are not limited to these materials, but can be composed of any kind of material that emits light having the wavelength in a range from 500 nm to 580 nm. The LEDs 11B are composed of layered thin-films having heterostructure or double heterostructure formed by epitaxially growing inorganic material such as gallium nitride, gallium indium nitride or the like. The LEDs 11B are not limited to these materials, but can be composed of any kind of material that emits light having the wavelength ranging from 450 nm to 500 nm.

The anode electrodes 14 and the cathode electrodes 15 are metal electrodes composed of gold, aluminum, or layered metal electrodes composed of gold or aluminum layered with nickel, titan or the like. The anode electrodes 14 and the cathode electrodes 15 are respectively connected to anodes and cathodes of the LEDs 11.

The anode wirings 12, the cathode wiring 13 and the interconnection wirings 21 are metal wirings composed of gold, aluminum, or layered metal wirings composed of gold or aluminum layered with nickel, titan or the like. The anode wiring 12 and the cathode wirings 13 are connected to the anode electrodes 14 and the cathode electrodes 15 of the LEDs 11 so that the LED 11R (that emits red light), the LED 11G (that emits green light) and the LED 11B (that emits blue light) of each column are electrically connected one bye one in series.

For example, with regard to the column (i.e., the left column in FIG. 25) in which the LEDs 11R1, 11G1 and 11B1 are aligned in a line, the anode wiring 12 is connected to the anode electrode 14 of the LED 11R1. The cathode electrode 15 of the LED 11R1 is connected to the anode electrode 14 of the LED 11G1 by the interconnection wiring 21. The cathode electrode 15 of the LED 11G1 is connected to the anode electrode 14 of the LED 11B1 the interconnection wiring 21.

The cathode electrode 15 of the LED 11B1 is connected to the cathode wiring 13. That is, the LEDs 11R1, 11G1 and 11B1 are electrically connected one by one in series. Similarly, with regard to the other columns, the LEDs 11G2, 11B2 and 11R2 arranged in a line are electrically connected one by one in series, and the LEDs 11B3, 11R3 and 11G3 arranged in a line are electrically connected one by one in series. In this regard, the ends of the anode wirings 12 are connected to the anode driver IC 31, and the ends of the cathode wirings 13 are connected to the cathode driver IC 32. With such a configuration, the anode electrodes 14 and the cathode electrodes 15 of the respective LEDs 11 are electrically connected to the anode driver IC 31 and the cathode driver IC 32 via the anode wirings 12, the cathode wirings 13 and the interconnection wirings 21.

In the example shown in FIGS. 24 and 25, 9 LEDs 11 are arranged in a grid of 3 rows and 3 columns at constant intervals. However, the number and the arranging manner of the LEDs 11 can be modified according to the required brightness and the size of the LED backlight device 101. For example, as shown in FIG. 26, it is also possible to arrange 12 LEDs 11R, 11G and 11B into four groups (islands) each of which includes 3 LEDs 11R, 11G and 11B arranged to form a triangle.

In this case, with regard to the group of the LEDs 11R1, 11G1 and 11B1 arranged to form a triangle, the anode electrode 14 of the LED 11R1 is connected to the anode wiring 12. Further, the cathode electrode 15 of the LED 11R1 is connected to the anode electrode 14 of the LED 11G1 via the interconnection wiring 21. The cathode electrode 15 of the LEDs 11G1 is connected to the anode electrode 14 of the LED 11B1 via the interconnection wiring 21. The cathode electrode 15 of the LED 11B1 is connected to the cathode wiring 13. In other words, the LEDs 11R1, 11G1 and 11B1 are electrically connected one by one in series. Similarly, with regard to the other groups, the LEDs 11G2, 11B2 and 11R2 (arranged to form a triangle) are electrically connected one bye one in series, the LEDs 11B3, 11R3 and 11G3 (arranged to form a triangle) are electrically connected one by one in series, and the LEDs 11B4, 11R4 and 11G4 (arranged to form a triangle) are electrically connected one by one in series. In this regard, the ends of the anode wirings 12 are connected to the anode driver IC 31, and the ends of the cathode wirings 13 are cathode driver IC 32. With such a configuration, the anode electrodes 14 and the cathode electrodes 15 of the respective LEDs 11 are electrically connected to the anode driver IC 31 and the cathode driver IC 32 via the anode wirings 12, the cathode wirings 13 and the interconnection wirings 21.

As shown in FIG. 23, the LED backlight device 101 includes the light diffusion plate 40 (i.e., the second substrate) in the form of a flat plate. The light diffusion plate 40 is formed of a plastic substrate having optical transparency. To be more specific, the light diffusion plate 40 is composed of a polymer material such as polycarbonate or polyethylene terephthalate, and has a function to uniformly diffuse incident light.

As shown in FIG. 23, the substrate 110 and the light diffusion plate 40 are disposed facing each other, so that the LED backlight device 101 is constituted. The surface of the substrate 110 (to which the LEDs 11 are fixed) and the light diffusion plate 40 are positioned so as to face each other. The heat releasing plate 60 is made of metal such as aluminum, and the thermally-conductive adhesive agent 50 composed of silicone resin or the like is coated on the surface of the heat releasing plate 60. The heat releasing plate 60 is bonded to the second surface (i.e., the lower surface) of the substrate 110 by means of the adhesive agent 50.

The anode driver IC 31 has a function to supply electric current to the LEDs 11 according to a lighting signal. The anode driver IC 31 includes circuits such as a constant current circuit or an amplifier circuit. The anode wirings 12 are connected to the anode electrodes 14 of the LEDs 11 and are also connected to driving elements of the anode driver IC 31. Although the anode driver IC 31 is provided on the substrate 110 in the examples shown in FIGS. 25 and 26, the anode driver IC 31 is not necessarily provided on the substrate 110, but can be provided on other print circuit board (not shown) or the like.

The cathode driver IC 32 has a function to allow the electric current to flow therein. The cathode driver IC 32 includes switching circuits such as transistor. The cathode wirings 13 are connected to the cathode electrodes 15 of the LEDs 11 and are also connected to the cathode driver IC 32. Although the cathode driver IC 32 is provided on the substrate 110 in the examples shown in FIGS. 25 and 26, the cathode driver IC 32 is not necessarily provided on the substrate 110, but can be provided on other print circuit board (not shown) or the like.

Figure 27:
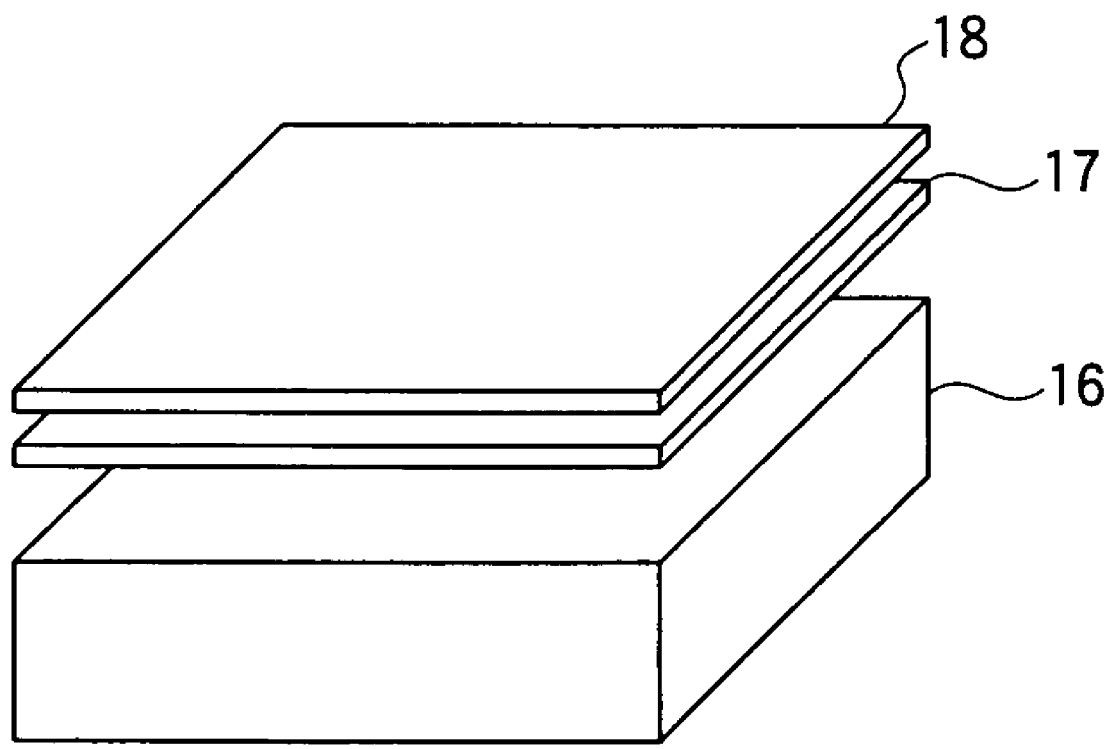
FIG. 27 is a schematic view showing a process for peeling an LED thin-film according to the seventh embodiment of the present invention.
Figure 28:
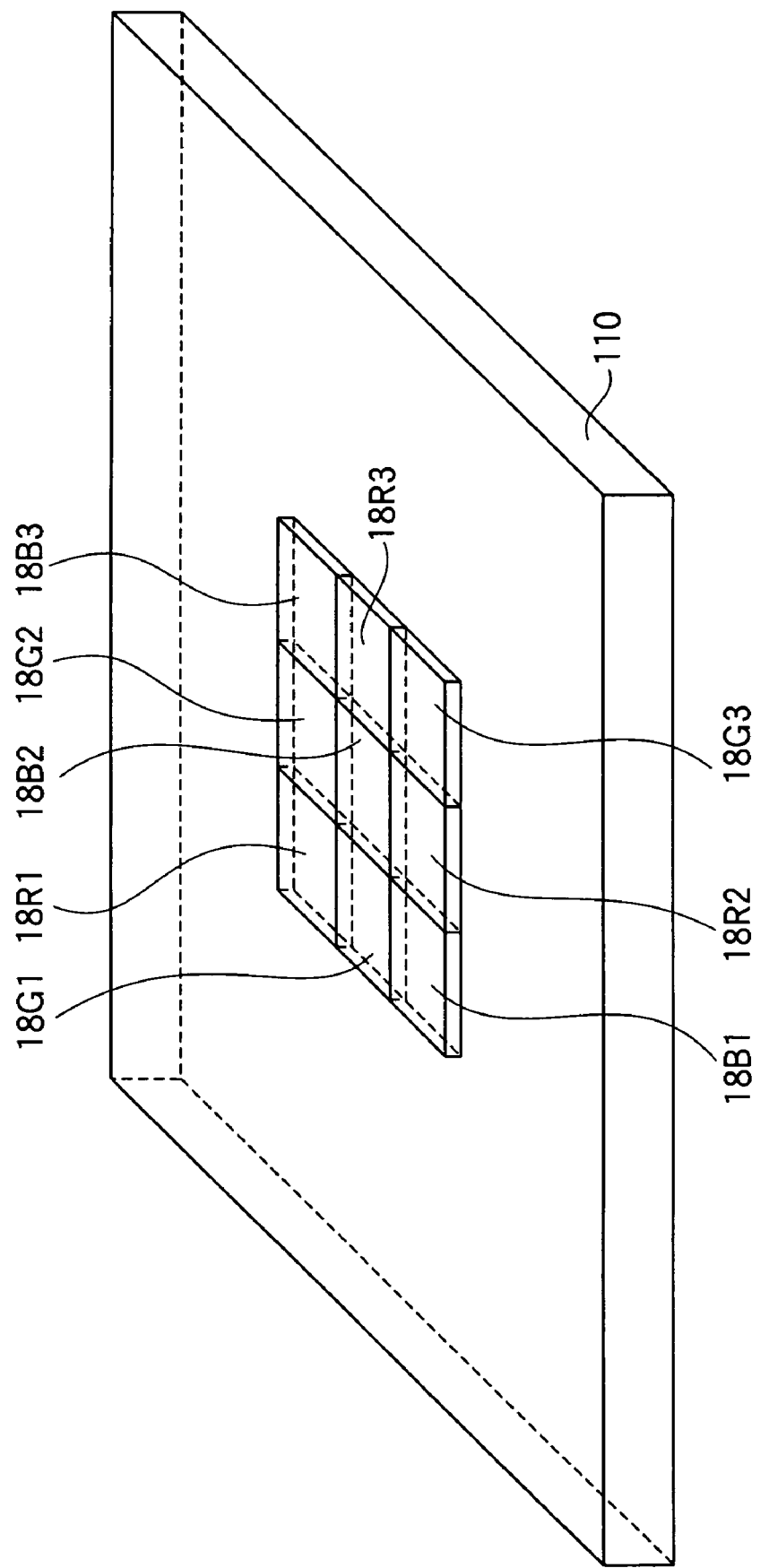
FIG. 28 is a first schematic view showing a process for fixing the LED thin-film to a substrate according to the seventh embodiment of the present invention.
Figure 29:
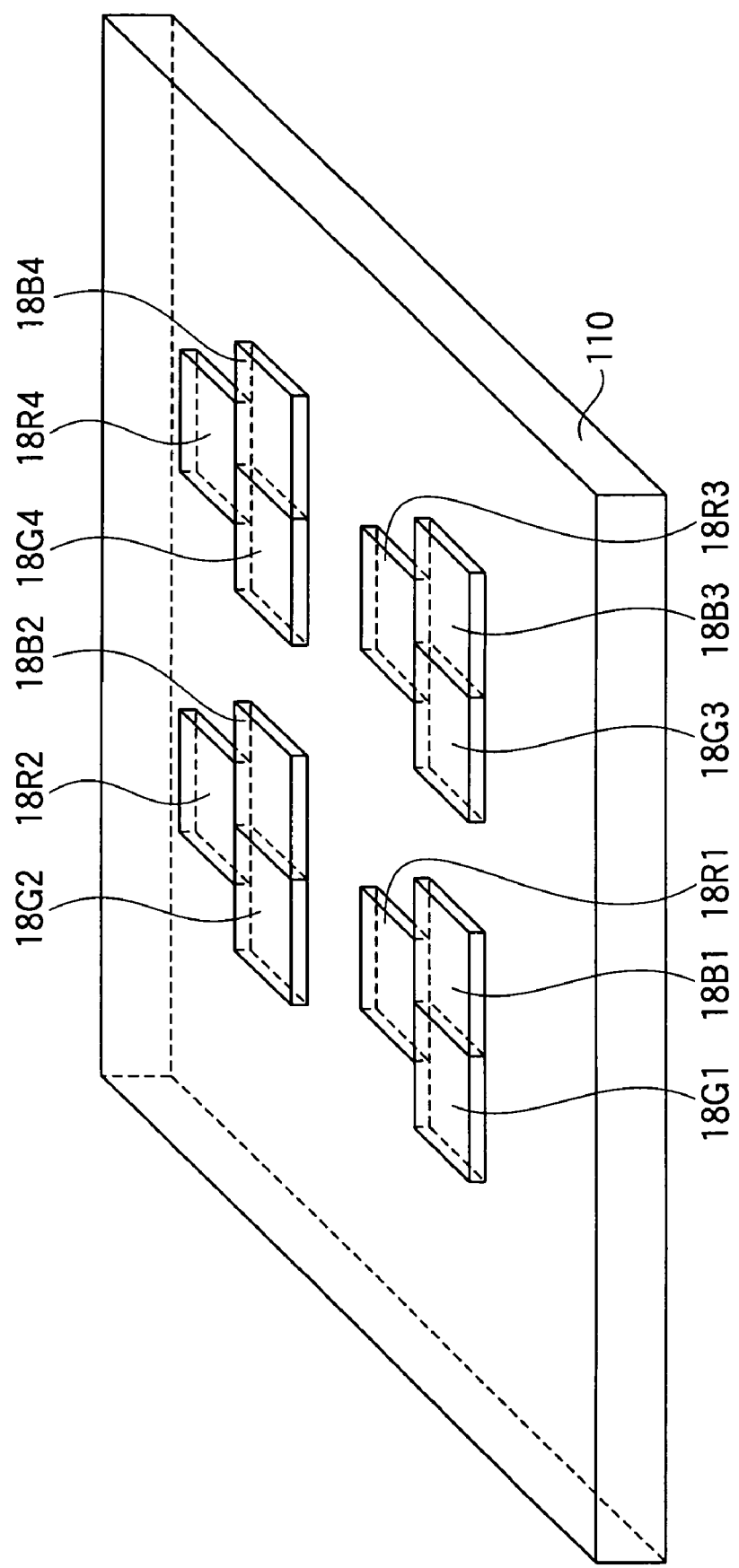
FIG. 29 is a second schematic view showing a process for fixing the LED thin-film to a substrate according to the seventh embodiment of the present invention.

Next, a process for providing the LEDs 11 on the substrate 110 according to the seventh embodiment will be described. FIG. 27 shows a process for peeling the LED thin-film 18 (the LED 11) according to the seventh embodiment of the present invention. FIG. 28 shows a process for fixing the LED thin-film 18 to the substrate 110 according to the seventh embodiment of the present invention. FIG. 29 shows a process for fixing the LED thin-film 18 to the substrate 110 according to another example of the seventh embodiment of the present invention.

As shown in FIG. 27, the LED thin-film 18 is in the form of a rectangular flat plate. For example, the LED thin-film 18R for forming the LED 11R that emits red light has a layered structure of heterostructure or double-heterostructure composed of a plurality of layers such as aluminum gallium arsenide, aluminum gallium indium arsenide.

The sacrificial layer 17 is provided between the base material 16 and the LED thin-film 18 for peeling (i.e., separating) the LED thin-film 18 from the base material 16. The sacrificial layer 17 is composed of material such as aluminum arsenide that can easily be etched by an etching solution described later.

The base material 16 is composed of, for example, gallium arsenide, gallium nitride, sapphire or the like. Inorganic material layers forming the LED thin-film 18 are epitaxially grown on the base material 16 using a vapor-phase growth method such as an MOCVD method.

Next, a process for peeling the LED thin-film 18 from the base material 16 will be described.

If each LED 11 forms, for example, a square having each side of 2 mm in length, the LED thin-film 18 is formed into a square shape having each side longer than 2 mm. In this case, the LED thin-film 18 is formed into a square shape using an etching solution such as a solution containing phosphoric acid, hydrogen peroxide and water ($H_3PO_4:H_2O_2:H_2O$) or the like, by means of a photolithographic etching technique broadly used in a semiconductor manufacturing process.

Next, the base material 16 on which the LED thin-film 18 is formed is immersed in an etching solution such as hydrogen fluoride solution, hydrochloric acid solution or the like. With this, the sacrificial surface 17 is etched (removed), and the LED thin-film 18 is peeled off from the base material 16.

Then, the LED thin-film 18 (having been peeled off from the base material 16) is pressed against the planarized surface of the substrate 110, so that the substrate 110 and the LED thin-film 18 are fixed to each other by means of intermolecular force and integrated with each other.

As was described in the fifth embodiment, the surface layer 110a of the substrate 110 is composed of an organic insulation film such as a polyimide film or an inorganic insulation film such as a silicon oxide film, and preferably has a flat surface whose surface accuracy is less than or equal to several tens of nanometers having no concaves or convexes. Since the surface of the substrate 110 is such a flat surface having no concave or convex, the bonding between the LED thin-film 18 and the substrate 110 by means of intermolecular force (such as hydrogen bonding or the like) can be easily achieved.

These processes are repeated, so that the LED thin-films 18R1, 18R2, 18R3 (18R4), 18G1, 18G2, 18G3 (18G4), 18B1, 18B2, 18B3 (18B4) are fixed to the substrate 110 and arranged in a plurality of columns, to be more specific, in a square grid of 3 rows and 3 columns as shown in FIG. 28, or arranged to form four triangles as shown in FIG. 29.

Subsequently, connecting portions for the anode electrodes 14 and the cathode electrodes 15 are formed on the LED thin-films 18 (having been fixed to the substrate 110) using, for example, a photolithographic etching method using an etching solution containing phosphoric acid, hydrogen peroxide and water ($H_3PO_4:H_2O_2:H_2O$). Further, the anode electrodes 14, the cathode electrodes 15, the anode wirings 12 (connected to the anode electrodes 14) and the cathode wirings 13 (connected to the cathode electrodes 15) are formed using a deposition, a photolithographic etching method or a lift-off method. Furthermore, the anode driver IC 31 and the cathode driver IC 32 are mounted on the substrate 110, and the anode wirings 12 and the cathode wirings 13 are respectively connected to the anode driver IC 31 and the cathode driver IC 32.

In the above description, each LED thin-film 18 has a square shape having each side of 2 mm in length. However, the length of the side of the LED thin-film 18 is not limited to 2 mm. Further, the LED thin-films 18 for forming the LEDs 11R, 11G and 11B can have different dimensions according to coloration or weighing of respective colors. The LED thin-film 18 can be of any shape such as a triangle, a square, a polygon, a circle or an ellipse.

Next, the operation of the LED backlight device 101 according to the seventh embodiment will be described.

A lighting signal is sent from a superior device (such as a not shown personal computer) to the anode driver IC 31, for activating the groups of LEDs 11 each of which includes three LEDs 11R, 11G and 11B electrically connected one by one in series. Upon receiving the lighting signal, the amplifier circuit of the anode driver IC 31 applies stable currents to the anode electrodes 14 of the first LEDs 11 of the respective groups via the anode wirings 12. When the lighting signal is inputted to the cathode driver IC 32, the cathode driver IC 32 allows the currents to flow therein from the cathode electrodes 15 of the third LEDs 11 of the respective groups through the cathode wirings 13 via the switching circuit. With this, currents flow from the anode driver IC 31 to the cathode driver IC 32 via three LEDs 11 of each group (electrically connected one by one in series), and the LEDs 11 of the respective colors emit lights.

In this case, since the LED 11R (that emits red light), the LED 11G (that emits green light) and the LED 11B (that emits blue light) are electrically connected in series in each group, the LEDs 11 of three colors can be driven at the same supply voltages and under the same current conditions, as long as piece-to-piece variation of the LED can be neglected.

Further, the heat generated by the emission of the LEDs 11R, 11G and 11B is diffused from the second surface (opposite to the first surface to which the LEDs 11 are fixed) of the substrate 110 via the thermally-conductive adhesive agent 50 and the heat releasing plate 60, and therefore the temperatures of the substrate 110 and the light diffusion plate 40 do not substantially increase.

As described above, according to the seventh embodiment, a plurality of groups of the LEDs 11 are provided, and each group includes the LED 11R (that emits red light), the LED 11G (that emits green light) and the LED 11B (that emits blue light) which are electrically connected in series. Further, the LEDs 11, the anode wirings 12 and the cathode wirings 13 are formed using the semiconductor process, and the LEDs 11 are connected to the anode wirings 12 and the cathode wirings 13 using the semiconductor process. Accordingly, a thin, large and high-intensity LED backlight device can be obtained using a simpler circuit structure compared with the first embodiment.

While the preferred embodiments of the present invention have been illustrated in detail, it should be apparent that modifications and improvements may be made to the invention without departing from the spirit and scope of the invention as described in the following claims.

What is claimed is:

1. An LED backlight device comprising:
    a first substrate having optical transparency and having a first surface and a second surface opposite to said first surface;
    an LED thin-film fixed to said first surface of said first substrate, said LED thin-film being formed of epitaxially grown inorganic material layers as a P-N junction device;
    an anode electrode and a cathode electrode formed on said LED thin-film;
    an anode driver IC and a cathode driver IC for driving said LED thin-film to emit light;
    an anode wiring formed on said first surface of said first substrate to electrically connect said anode driver IC and said anode electrode of said LED thin-film,
    a cathode wiring formed on said first surface of said first substrate to electrically connect said cathode driver IC and said cathode electrode of said LED thin-film, and
    a second substrate having optical transparency and having a function to diffuse incident light, said second substrate being provided so as to face said second surface of said first substrate.

2. The LED backlight device according to claim 1, wherein said LED thin-film is fixed to said first surface of said first substrate by means of intermolecular force, and
    wherein said LED thin-film includes an LED thin-film that emits red light having wavelength in a range from 620 nm to 710 nm, an LED thin-film that emits green light having wavelength in a range from 500 nm to 580 nm, and an LED thin-film that emits blue light having wavelength in a range from 450 to 500 nm.

3. The LED backlight device according to claim 1, wherein said first surface of said first substrate is formed of an organic or inorganic insulation film, and is planarized.

4. The LED backlight device according to claim 1, wherein said LED thin-film is obtained by epitaxially growing inorganic material layers as a P-N junction device on a sacrificial layer formed on a base material different from said first substrate, separating said inorganic material layers from said base material by removing said sacrificial material layers using etching, fixing said inorganic material layers to said first surface of said first substrate by means of intermolecular force, and etching said inorganic material layers.

5. The LED backlight device according to claim 1, wherein a plurality of said LED thin-films are arranged in rows and columns at intervals on said first surface of said first substrate.

6. The LED backlight device according to claim 1 wherein said LED thin-film includes an LED thin-film that emits red light having wavelength in a range from 620 nm to 710 nm, an LED thin-film that emits green light having wavelength in a range from 500 nm to 580 nm, and an LED thin-film that emits blue light having wavelength in a range from 450 to 500 nm;
    wherein said LED thin-films that respectively emit said red, green and blue lights constitute an LED group;
    wherein said anode wiring electrically connects said anode driver IC and said anode electrode of an endmost LED thin-film of said LED group;
    wherein said cathode wiring electrically connects said cathode driver IC and said cathode electrode of another endmost LED thin-film of said LED group, and
    wherein an interconnection wiring is provided to electrically connect said LED thin-films of said LED group in series.

7. The LED backlight device according to claim 1, further comprising:
    a first protection film having insulating property formed on said first surface of said first substrate so as to cover said LED thin-film;
    a reflection film formed on said first insulating protection film, and
    a second protection film having insulating property formed so as to cover said reflection film.

8. The LED backlight device according to claim 1, further comprising:
    a protection film having insulating property formed on said first surface of said first substrate so as to cover said LED thin-film, and
    a heat releasing plate disposed on said first surface of said first substrate via said insulating protection film.

9. An LCD device comprising:
    said LED backlight device according to claim 1, and
    an LCD panel provided so as to face said LED backlight device.

10. An LED backlight device comprising:
    a first substrate having a function to diffuse incident light, having optical transparency and having a first surface;
    an LED thin-film fixed to said first surface of said first substrate, said LED thin-film being formed of epitaxially grown inorganic material layers as a P-N junction device;
    an anode electrode and a cathode electrode formed on said LED thin-film;
    an anode driver IC and a cathode driver IC for driving said LED thin-film to emit light;
    an anode wiring formed on said first surface of said first substrate to electrically connect said anode driver IC and said anode electrode of said LED thin-film, and
    a cathode wiring formed on said first surface of said first substrate to electrically connect said cathode driver IC and said cathode electrode of said LED thin-film.

11. The LED backlight device according to claim 10, wherein said LED thin-film is fixed to said first surface of said first substrate by means of intermolecular force, and
    wherein said LED thin-film includes an LED thin-film that emits red light having wavelength in a range from 620 nm to 710 nm, an LED thin-film that emits green light having wavelength in a range from 500 nm to 580 nm, and an LED thin-film that emits blue light having wavelength in a range from 450 to 500 nm.

12. The LED backlight device according to claim 10, wherein said first surface of said first substrate is formed of an organic or inorganic insulation film, and is planarized.

13. The LED backlight device according to claim 10, wherein said LED thin-film is obtained by epitaxially growing inorganic material layers as a P-N junction device on a sacrificial layer formed on a base material different from said first substrate, separating said inorganic material layers from said base material by removing said sacrificial material layers using etching, fixing said inorganic material layers to said first surface of said first substrate by means of intermolecular force, and etching said inorganic material layers.

14. The LED backlight device according to claim 10, wherein a plurality of said LED thin-films are arranged in rows and columns at intervals on said first surface of said first substrate.

15. The LED backlight device according to claim 10, wherein said LED thin-film includes an LED thin-film that emits red light having wavelength in a range from 620 nm to 710 nm, an LED thin-film that emits green light having wavelength in a range from 500 nm to 580 nm, and an LED thin-film that emits blue light having wavelength in a range from 450 to 500 nm;
  wherein said LED thin-films that respectively emit said red, green and blue lights constitute an LED group;
  wherein said anode wiring electrically connects said anode driver IC and said anode electrode of an endmost LED thin-film of said LED group;
  wherein said cathode wiring electrically connects said cathode driver IC and said cathode electrode of another endmost LED thin-film of said LED group, and
  wherein an interconnection wiring is provided to electrically connect said LED thin-films of said LED group in series.

16. The LED backlight device according to claim 10, further comprising:
  a first protection film having insulating property formed on said first surface of said first substrate so as to cover said LED thin-film;
  a reflection film formed on said first insulating protection film, and
  a second protection film having insulating property formed so as to cover said reflection film.

17. The LED backlight device according to claim 10, further comprising:
  a protection film having insulating property formed on said first surface of said first substrate so as to cover said LED thin-film, and
  a heat releasing plate disposed on said first surface of said first substrate via said insulating protection film.

18. An LCD device comprising:
  said LED backlight device according to claim 10, and
  an LCD panel provided so as to face said LED backlight device.

19. An LED backlight device comprising:
  a first substrate having thermal conductivity and having a first surface;
  an LED thin-film fixed to said first surface of said first substrate, said LED thin-film being formed of epitaxially grown inorganic material layers as a P-N junction device;
  an anode electrode and a cathode electrode formed on said LED thin-film;
  an anode driver IC and a cathode driver IC for driving said LED thin-film to emit light;
  an anode wiring formed on said first surface of said first substrate to electrically connect said anode driver IC and said anode electrode of said LED thin-film,
  a cathode wiring formed on said first surface of said first substrate to electrically connect said cathode driver IC and said cathode electrode of said LED thin-film, and
  a second substrate having optical transparency and having a function to diffuse incident light, said second substrate being provided so as to face said first surface of said first substrate.

20. The LED backlight device according to claim 19, wherein said LED thin-film is fixed to said first surface of said first substrate by means of intermolecular force, and
  wherein said LED thin-film includes an LED thin-film that emits red light having wavelength in a range from 620 nm to 710 nm, an LED thin-film that emits green light having wavelength in a range from 500 nm to 580 nm, and an LED thin-film that emits blue light having wavelength in a range from 450 to 500 nm.

21. The LED backlight device according to claim 19, wherein said first surface of said first substrate is formed of an organic or inorganic insulation film, and is planarized.

22. The LED backlight device according to claim 19, wherein said LED thin-film is obtained by epitaxially growing inorganic material layers as a P-N junction device on a sacrificial layer formed on a base material different from said first substrate, separating said inorganic material layers from said base material by removing said sacrificial material layers using etching, fixing said inorganic material layers to said first surface of said first substrate by means of intermolecular force, and etching said inorganic material layers.

23. The LED backlight device according to claim 19, wherein a plurality of said LED thin-films are arranged in rows and columns at intervals on said first surface of said first substrate.

24. The LED backlight device according to claim 19, wherein said LED thin-film includes an LED thin-film that emits red light having wavelength in a range from 620 nm to 710 nm, an LED thin-film that emits green light having wavelength in a range from 500 nm to 580 nm, and an LED thin-film that emits blue light having wavelength in a range from 450 to 500 nm;
  wherein said LED thin-films that respectively emit said red, green and blue lights constitute an LED group;
  wherein said anode wiring electrically connects said anode driver IC and said anode electrode of an endmost LED thin-film of said LED group;
  wherein said cathode wiring electrically connects said cathode driver IC and said cathode electrode of another endmost LED thin-film of said LED group, and
  wherein an interconnection wiring is provided to electrically connect said LED thin-films of said LED group in series.

25. The LED backlight device according to claim 19, further comprising:
  a reflection film formed on said first surface of said first substrate,
  an organic or inorganic insulation film formed so as to cover said reflection film and having a planarized surface to which said LED thin-film is fixed.

26. The LED backlight device according to claim 19, further comprising a heat releasing plate provided on a second surface of said first substrate opposite to said first substrate.

27. An LCD device comprising:
  said LED backlight device according to claim 19, and
  an LCD panel provided so as to face said LED backlight device.

* * * * *